(12) United States Patent
Roundtree et al.

(10) Patent No.: US 8,744,414 B2
(45) Date of Patent: Jun. 3, 2014

(54) METHODS OF INTERACTING BETWEEN MOBILE DEVICES AND VOICE RESPONSE SYSTEMS

(75) Inventors: Brian Roundtree, Seattle, WA (US); Jake A. Russell, Bellevue, WA (US)

(73) Assignee: Nuance Communications, Inc., Burlington, MA (US)

( * ) Notice: Subject to any disclaimer, the term of this patent is extended or adjusted under 35 U.S.C. 154(b) by 841 days.

(21) Appl. No.: 12/521,989

(22) PCT Filed: Jan. 7, 2008

(86) PCT No.: PCT/US2008/050447
§ 371 (c)(1),
(2), (4) Date: Dec. 8, 2009

(87) PCT Pub. No.: WO2008/086320
PCT Pub. Date: Jul. 17, 2008

(65) Prior Publication Data
US 2010/0087175 A1    Apr. 8, 2010

Related U.S. Application Data

(60) Provisional application No. 60/883,609, filed on Jan. 5, 2007, provisional application No. 60/948,424, filed on Jul. 6, 2007.

(51) Int. Cl.
*H04M 3/42* (2006.01)
(52) U.S. Cl.
USPC .................. 455/414.1; 455/418; 455/563
(58) Field of Classification Search
USPC ........ 455/412.2, 414.1, 414.3, 415, 418, 423, 455/425, 407, 420, 456.6, 563, 566; 370/259–271; 379/157, 158, 379/201.01–218.02

See application file for complete search history.

(56) References Cited

U.S. PATENT DOCUMENTS

| | | | |
|---|---|---|---|
| 4,730,252 A | 3/1988 | Bradshaw |
| 5,422,656 A | 6/1995 | Allard et al. |
| 5,475,735 A | 12/1995 | Williams et al. |
| 5,638,369 A | 6/1997 | Ayerst et al. |
| 5,675,628 A | 10/1997 | Hokkanen |
| 5,790,798 A | 8/1998 | Beckett, II et al. |

(Continued)

FOREIGN PATENT DOCUMENTS

| | | |
|---|---|---|
| CA | 2454334 A1 | 2/2003 |
| CN | 1283341 A | 2/2001 |

(Continued)

OTHER PUBLICATIONS

U.S. Appl. No. 12/595,803, filed Oct. 13, 2009, Roundtree et al.

(Continued)

*Primary Examiner* — Dinh P Nguyen
(74) *Attorney, Agent, or Firm* — Perkins Coie LLP

(57) ABSTRACT

A system and method of facilitating communications between a mobile device and an interactive voice response system is described. In some cases, the mobile device determines a called number is associated with an IVR system, and performs an action in response to the determination. For example, the mobile device may present visual information to a user related to audio information received from the IVR system. In some cases, the mobile device sends DTMF tones to the IVR system in response to or without user input.

24 Claims, 13 Drawing Sheets

(56) References Cited

U.S. PATENT DOCUMENTS

| | | |
|---|---|---|
| 5,831,598 A | 11/1998 | Kauffert et al. |
| 5,845,211 A | 12/1998 | Roach, Jr. |
| 6,031,467 A | 2/2000 | Hymel et al. |
| 6,151,507 A | 11/2000 | Laiho et al. |
| 6,199,045 B1 | 3/2001 | Giniger et al. |
| 6,219,047 B1 | 4/2001 | Bell |
| 6,245,756 B1 | 6/2001 | Patchev et al. |
| 6,246,756 B1 | 6/2001 | Borland et al. |
| 6,301,480 B1 | 10/2001 | Kennedy, III et al. |
| 6,368,205 B1 | 4/2002 | Frank et al. |
| 6,370,399 B1 | 4/2002 | Phillips |
| 6,389,278 B1 | 5/2002 | Singh |
| 6,424,945 B1 | 7/2002 | Sorsa et al. |
| 6,430,252 B2 | 8/2002 | Reinwand et al. |
| 6,430,407 B1 | 8/2002 | Turtiainen et al. |
| 6,496,979 B1 | 12/2002 | Chen et al. |
| 6,615,038 B1 | 9/2003 | Moles et al. |
| 6,618,478 B1 | 9/2003 | Stuckman et al. |
| 6,646,570 B1 | 11/2003 | Yamada et al. |
| 6,654,594 B1 | 11/2003 | Hughes et al. |
| 6,668,169 B2 | 12/2003 | Burgan et al. |
| 6,720,864 B1 | 4/2004 | Wong et al. |
| 6,748,211 B1 | 6/2004 | Isaac et al. |
| 6,766,017 B1 | 7/2004 | Yang et al. |
| 6,792,280 B1 | 9/2004 | Hori et al. |
| 6,819,932 B2 | 11/2004 | Allison et al. |
| 6,909,910 B2 | 6/2005 | Pappalardo et al. |
| 6,922,721 B1 | 7/2005 | Minborg et al. |
| 6,931,258 B1 | 8/2005 | Jarnstrom et al. |
| 6,940,844 B2 | 9/2005 | Purkayastha et al. |
| 6,944,447 B2 | 9/2005 | Portman et al. |
| 6,970,698 B2 | 11/2005 | Majmundar et al. |
| 6,978,147 B2 | 12/2005 | Coombes |
| 7,024,199 B1 | 4/2006 | Massie et al. |
| 7,031,697 B2 | 4/2006 | Yang et al. |
| 7,080,321 B2 | 7/2006 | Aleksander et al. |
| 7,099,288 B1 | 8/2006 | Parker et al. |
| 7,177,665 B2 | 2/2007 | Ishigaki et al. |
| 7,190,960 B2 | 3/2007 | Wilson et al. |
| 7,194,257 B2 | 3/2007 | House et al. |
| 7,209,964 B2 | 4/2007 | Dugan et al. |
| 7,236,166 B2 | 6/2007 | Zinniel et al. |
| 7,308,497 B2 | 12/2007 | Louviere et al. |
| 7,353,016 B2 | 4/2008 | Roundtree et al. |
| 7,359,706 B2 | 4/2008 | Zhao |
| 7,376,414 B2 | 5/2008 | Engstrom |
| 7,379,969 B2 | 5/2008 | Osborn, Jr. |
| 7,493,381 B2 | 2/2009 | Garg |
| 7,539,484 B2 | 5/2009 | Roundtree |
| 7,558,965 B2 | 7/2009 | Wheeler et al. |
| 7,647,075 B2 | 1/2010 | Tsuda et al. |
| 7,783,729 B1 | 8/2010 | Macaluso |
| 7,899,915 B2 | 3/2011 | Reisman |
| 2001/0014615 A1 | 8/2001 | Dahm et al. |
| 2001/0046886 A1 | 11/2001 | Ishigaki |
| 2002/0034940 A1 | 3/2002 | Takae et al. |
| 2002/0065109 A1 | 5/2002 | Mansikkaniemi et al. |
| 2002/0112172 A1 | 8/2002 | Simmons |
| 2002/0115476 A1 | 8/2002 | Padawer et al. |
| 2002/0123368 A1 | 9/2002 | Yamadera et al. |
| 2002/0128036 A1 | 9/2002 | Yach et al. |
| 2002/0152229 A1 | 10/2002 | Peng |
| 2002/0155476 A1 | 10/2002 | Pourmand et al. |
| 2003/0013483 A1 | 1/2003 | Ausems et al. |
| 2003/0039948 A1 | 2/2003 | Donahue |
| 2003/0053615 A1 | 3/2003 | Anderson et al. |
| 2003/0112931 A1 | 6/2003 | Brown et al. |
| 2003/0187650 A1 | 10/2003 | Moore et al. |
| 2003/0204725 A1 | 10/2003 | Itoi et al. |
| 2003/0233461 A1 | 12/2003 | Mariblanca-Nieves et al. |
| 2004/0121814 A1* | 6/2004 | Creamer et al. ............. 455/563 |
| 2004/0132431 A1 | 7/2004 | Vandermeijden et al. |
| 2004/0142720 A1 | 7/2004 | Smethers |
| 2004/0171375 A1 | 9/2004 | Chow-Toun |
| 2004/0172561 A1 | 9/2004 | Iga |
| 2004/0193444 A1 | 9/2004 | Hufford et al. |
| 2004/0198316 A1 | 10/2004 | Johnson |
| 2005/0266798 A1 | 12/2005 | Moloney et al. |
| 2006/0003758 A1 | 1/2006 | Bishop et al. |
| 2006/0047830 A1 | 3/2006 | Nair et al. |
| 2006/0158436 A1 | 7/2006 | LaPointe et al. |
| 2006/0168303 A1 | 7/2006 | Oyama et al. |
| 2006/0229054 A1 | 10/2006 | Erola et al. |
| 2006/0245391 A1 | 11/2006 | Vaidya et al. |
| 2006/0274869 A1 | 12/2006 | Morse |
| 2007/0019563 A1 | 1/2007 | Ramachandran et al. |
| 2007/0061243 A1 | 3/2007 | Ramer et al. |
| 2007/0064743 A1 | 3/2007 | Bettis et al. |
| 2007/0123223 A1* | 5/2007 | Letourneau et al. ........ 455/414.1 |
| 2007/0155411 A1* | 7/2007 | Morrison ..................... 455/466 |
| 2007/0173237 A1 | 7/2007 | Roundtree |
| 2007/0207795 A1 | 9/2007 | Roundtree |
| 2007/0293199 A1 | 12/2007 | Roundtree et al. |
| 2007/0293200 A1 | 12/2007 | Roundtree et al. |
| 2008/0039056 A1 | 2/2008 | Mathews et al. |
| 2008/0189550 A1 | 8/2008 | Roundtree |
| 2008/0194296 A1 | 8/2008 | Roundtree |
| 2008/0256447 A1 | 10/2008 | Roundtree et al. |
| 2008/0280588 A1 | 11/2008 | Roundtree et al. |
| 2009/0124271 A1 | 5/2009 | Roundtree et al. |
| 2010/0279669 A1 | 11/2010 | Roundtree |
| 2011/0117894 A1 | 5/2011 | Roundtree et al. |
| 2013/0005312 A1 | 1/2013 | Roundtree et al. |

FOREIGN PATENT DOCUMENTS

| | | |
|---|---|---|
| CN | 2478292 | 2/2002 |
| CN | 1361995 A | 7/2002 |
| CN | 1611087 A | 4/2005 |
| EP | 1387241 A2 | 2/2004 |
| GB | 2340344 A | 2/2000 |
| GB | 2365711 A | 2/2002 |
| JP | 62072058 A | 4/1987 |
| JP | 07-203536 A | 8/1995 |
| JP | 09-507986 T | 8/1997 |
| JP | 10084404 A | 3/1998 |
| JP | 11-195062 A | 7/1999 |
| JP | 11259199 A | 9/1999 |
| JP | 2000348022 A | 12/2000 |
| JP | 2001069204 A | 3/2001 |
| JP | 2002-135848 A | 5/2002 |
| JP | 200305880 | 1/2003 |
| JP | 2003067334 A | 3/2003 |
| JP | 2003108182 A | 4/2003 |
| JP | 2003-188982 A | 7/2003 |
| JP | 2003186590 A | 7/2003 |
| JP | 2003-280803 A | 10/2003 |
| JP | 2003-303172 A | 10/2003 |
| JP | 2003-308148 A | 10/2003 |
| JP | 2003-309880 A | 10/2003 |
| JP | 2004021580 A | 1/2004 |
| JP | 2004032056 A | 1/2004 |
| JP | 2004-048790 A | 2/2004 |
| JP | 2004364122 A | 12/2004 |
| JP | 2005110063 A | 4/2005 |
| JP | 1538855 A2 | 6/2005 |
| JP | 2005167463 A | 6/2005 |
| KR | 200344337 | 6/2003 |
| WO | WO-9707641 | 2/1997 |
| WO | WO-0070888 A2 | 11/2000 |
| WO | WO-0186472 A1 | 11/2001 |
| WO | WO-2005081852 A2 | 9/2005 |
| WO | WO-2005083996 A1 | 9/2005 |
| WO | WO-2007002499 A2 | 1/2007 |
| WO | WO-2007044972 A2 | 4/2007 |
| WO | WO-2007070837 A2 | 6/2007 |
| WO | WO-2007092908 A2 | 8/2007 |
| WO | WO-2008042989 A1 | 4/2008 |
| WO | WO-2008086320 A1 | 7/2008 |
| WO | WO-2008128119 A1 | 10/2008 |

OTHER PUBLICATIONS

U.S. Appl. No. 12/720,624, filed Mar. 9, 2010, Roundtree et al.

(56) References Cited

OTHER PUBLICATIONS

SNAPin Software Inc., "SNAPin White Paper: The Service Experience Opportunity," <http://www.snapin.com>, 2005, 16 pages.
U.S. Appl. No. 11/917,323, filed Dec. 12. 2007, Roundtree et al.
U.S. Appl. No. 12/370,524, filed Feb. 12, 2009, Roundtree.
U.S. Appl. No. 12/444,332, filed Apr. 3, 2009, Roundtree.
U.S. Appl. No. 12/446,221, filed Apr. 17, 2009, Roundtree.
U.S. Appl. No. 12/522,901, filed Jul. 1, 2009, Roundtree.
3rd Generation Partnership Project. "Specification of the SIM Application Toolkit for the Subscriber Identity Module—Mobile Equipment (SIM-ME) Interface (Release 1999)," 3GPP Organizational Partners, 2004, 143 pages.
Center for Customer Driven Quality at Purdue University, "It's the Solution, Stupid," 2004 2 pages.
Gartner, Contact Center Investment Strategy and Leading Edge Technologies, http://www.gartner.com/4_decision_tools/measurements/measure_tarticles/2002_12/contact_center investment strategy.jsp, accessed on Jul. 8, 2008, 4 pages.
International Search Report for Interntional Application No. PCT/US08/50447, dated Apr. 10, 2008, Applicant SNAPin Software Inc.
Supplementary European Search Report for European Patent Application No. 06840247.8, Mail Date Feb. 2, 2012, 8 pages.
U.S. Appl. No. 13/269,970, filed Oct. 10, 2011.
Extended European Search Report for European Application No. 12005720.3, Dated Dec. 20, 2012, 6 pages.

\* cited by examiner

US 8,744,414 B2

METHODS OF INTERACTING BETWEEN MOBILE DEVICES AND VOICE RESPONSE SYSTEMS

CROSS-REFERENCE TO RELATED APPLICATION(S)

This application is a U.S. National Phase application of International Application Serial No. PCT/US2008/050447, filed on Jan. 7, 2008, which claims priority to U.S. Provisional Patent Application No. 60/883,609, filed on Jan. 5, 2007, entitled CALL INTERCEPT METHODS, SUCH AS INTERACTIVE VOICE RESPONSE NAVIGATION METHOD and U.S. Provisional Patent Application No. 60/948,424, filed on Jul. 6, 2007, entitled METHODS OF INTERACTING BETWEEN MOBILE DEVICES AND VOICE RESPONSE SYSTEMS, both of which are incorporated by reference in their entirety. This application is related to U.S. patent application Ser. No. 11/672,499, filed on Feb. 7, 2007, now U.S. Pat. No. 7,539,484, entitled A METHOD AND SYSTEM OF ENHANCING VOICE CALLS, SUCH AS ENHANCING VOICE CALLS WITH DATA SERVICES, which is incorporated by reference in its entirety.

BACKGROUND

Current methods for assisting customers at a mobile device often require a call to a call center and retrieval of data from a network. For example, a subscriber may dial an information number from their mobile device, such as "411." Once the subscriber dials the number, an automated system (or an operator) may answer the call and provide the subscriber with a menu of options. The subscriber selects an option from the menu by pressing buttons on the mobile device or by saying the option. Once the subscriber requests data by selecting an option, the automated system retrieves the data from a network and delivers the data to the subscriber over the mobile device.

In many cases calls to information, customer assistance, or other numbers are answered by automated voice response systems. Typically, automated systems attempt to interact with subscribers by sending prerecorded questions and waiting for responses. These systems may be limited in how they interact with subscribers.

These and other problems exist with respect to assisting users of wireless devices.

DETAILED DESCRIPTION

Figure 1:
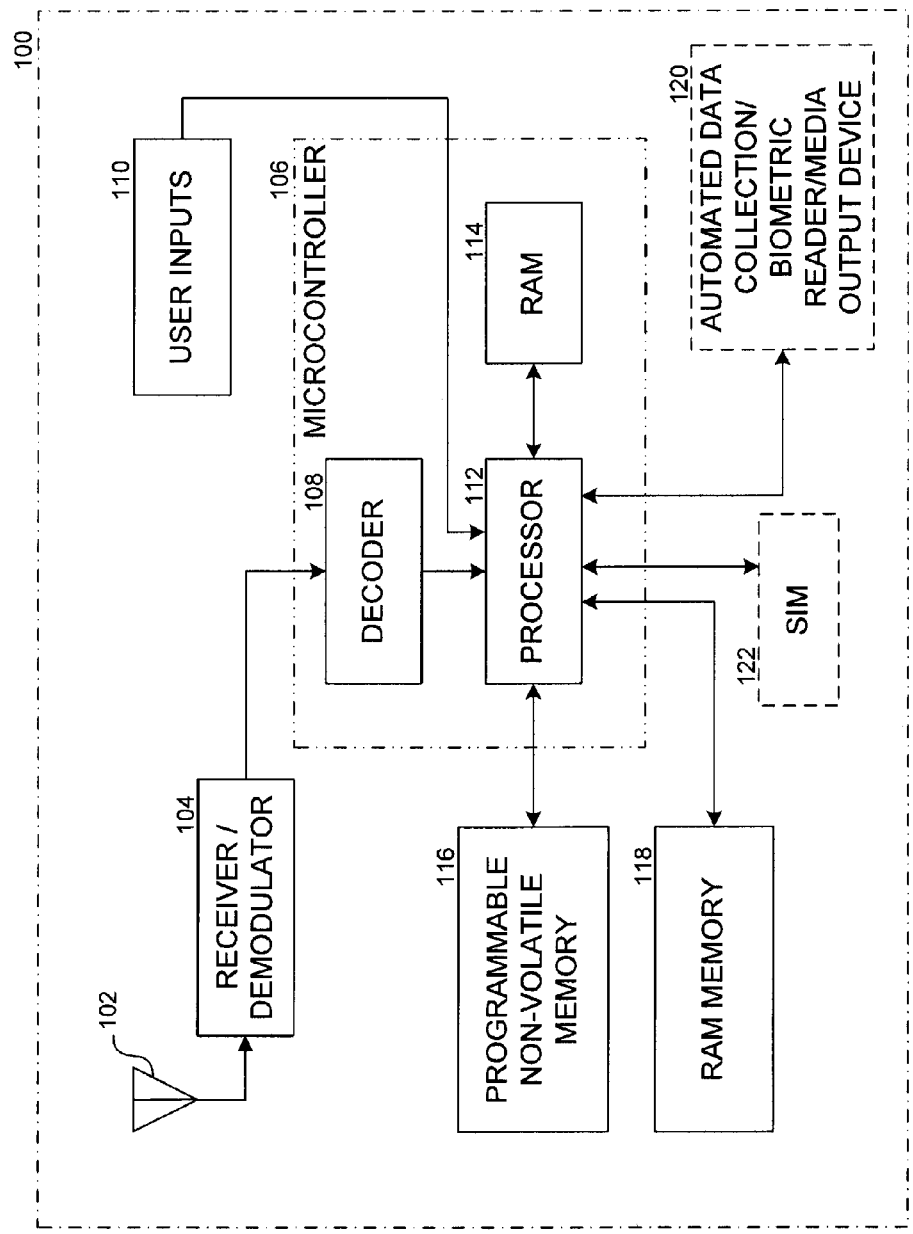
FIG. 1 is a schematic diagram illustrating a mobile device on which interactive voice response navigation methods can be implemented.

A method and system of interacting with voice recognition systems such as IVR systems using a mobile device is disclosed. Subscribers may dial one or more predetermined numbers on their respective mobile device. Software on the mobile device determines whether the number corresponds to one of the predetermined numbers (such as a number known to be associated with an IVR system). The device may initiate a script when the number is dialed, before or after the call has gone through, while the call is on hold, and so on. For example, if the number dialed matches a known voice enhanced number, the mobile device executes a script that facilitates interactions between the mobile device and an IVR system related to the voice enhanced number.

In some examples, the system performs one or more actions during an ongoing voice call between a user and an IVR system. For example, a mobile device may visually display to a user content associated with information provided to the user over the voice channel by the IVR system. The device may facilitate interactions between the user and the IVR system by using input received from the user in response to the visually displayed content. For example, the device may display one or more options related to a posed inquiry by the IVR system, receive user input selecting one of the options, and transmit the user selections to the IVR system, navigating the IVR system for the user. In some cases, the device may generate and send DTMF tones to the IVR system in response to user input, enabling the device to navigate the voice response aspects of the IVR system.

In some examples, the device may transmit identification information about the user and/or mobile device to a workflow system associated with an IVR system at a customer support or other assistance center. For example, the device may transmit diagnostic information related to the configuration of the device, initiate a call to an IVR system, and navigate the IVR system using simulated audio commands (e.g., DTMF tones). The device may do so with or without user interaction or knowledge.

The technology will now be described with respect to various embodiments. The following description provides specific details for a thorough understanding of, and enabling description for, these embodiments of the technology. However, one skilled in the art will understand that the technology may be practiced without many of these details. In other instances, well-known structures and functions have not been shown or described in detail to avoid unnecessarily obscuring the description of the embodiments of the technology.

It is intended that the terminology used in the description presented below be interpreted in its broadest reasonable manner, even though it is being used in conjunction with a detailed description of certain specific embodiments of the technology. Certain terms may even be emphasized below; however, any terminology intended to be interpreted in any restricted manner will be overtly and specifically defined as such in this Detailed Description section.

Suitable System

FIG. 1 illustrates a mobile device 100 on which IVR interactions can be implemented in accordance with several embodiments of the technology. A receiver/demodulator 104 receives a transmitted signal via an antenna 102 and reconstructs the original transmitted signal. The transmitted signal is sent to a microcontroller 106, which consists of a decoder 108, a processor 112, and RAM (Random Access Memory) 114. The decoder 108 translates the signals into meaningful data and interfaces to other devices. Decoded data, along with subscriber inputs 110, are sent to the processor 112. In addition, the mobile device may include optional components, such as an automated data collection 120 unit linked to the processor 112, which can include an automated RFID (Radio Frequency Identification) tag reader, a magnetic card swipe reader, a bar code reader, and others. Additionally, or alternatively, the mobile device may include a biometric reader (e.g., thumbprint reader, voice fingerprint recognition functionality, etc.), and/or a media output device (e.g., MP3 player, television tuner/player, etc.) 120. The mobile device 100 may also include a subscriber identity module (SIM) 122. The output of the processor 112 can be stored in a programmable non-volatile memory 116 or in the RAM memory 118. The mobile device 100 may also include user output components, such as a display screen, speakers, and other components that enable a user to interact with the mobile device. The user may interact via input components, such as a keypad, via the screen (using touch-based interfaces), via voiced inputs, and so on.

Additionally, the subscriber identity module, or SIM card, may contain any or all of the processing components, memory components or storage components described herein. To that end, the device may perform SIM card based processing, memory, or storage.

FIG. 1 and the discussion herein provide a brief, general description of a suitable telecommunications or computing environment in which the technology can be implemented. Although not required, aspects of the technology are described in the general context of computer-executable instructions, such as routines executed by a general-purpose computer, e.g., a server compute or personal computer. Those skilled in the relevant art will appreciate that the technology can be practiced with other communications, data processing, or computer system configurations, including: Internet appliances, hand-held devices (including personal digital assistants (PDAs)), wearable computers, all manner of cellular or mobile phones, multi-processor systems, microprocessor-based or programmable consumer electronics, set-top boxes, network PCs, mini-computers, mainframe computers, and the like. Indeed, the terms "computer," "host," and "host computer," and "mobile device" and "handset" are generally used interchangeably herein, and refer to any of the above devices and systems, as well as any data processor.

Aspects of the technology can be embodied in a special purpose computing device or data processor that is specifically programmed, configured, or constructed to perform one or more of the computer-executable instructions explained in detail herein. Aspects of the technology may also be practiced in distributed computing environments where tasks or modules are performed by remote processing devices, which are linked through a communications network, such as a Local Area Network (LAN), Wide Area Network (WAN), or the Internet. In a distributed computing environment, program modules may be located in both local and remote memory storage devices.

Aspects of the technology may be stored or distributed on computer-readable media, including magnetically or optically readable computer discs, hard-wired or preprogrammed chips (e.g., EEPROM semiconductor chips), nanotechnology memory, biological memory, or other data storage media. Indeed, computer implemented instructions, data structures, screen displays, and other data under aspects of the technology may be distributed over the Internet or over other networks (including wireless networks), on a propagated signal on a propagation medium (e.g., an electromagnetic wave(s), a sound wave, etc.) over a period of time, or they may be provided on any analog or digital network (packet switched, circuit switched, or other scheme). Those skilled in the relevant art will recognize that portions of the technology reside on a server computer, while corresponding portions reside on a client computer such as a mobile or portable device, and thus, while certain hardware platforms are described herein, aspects of the technology are equally applicable to nodes on a network. In an alternative embodiment, the mobile device or portable device may represent the server portion, while the server may represent the client portion.

Figure 2:
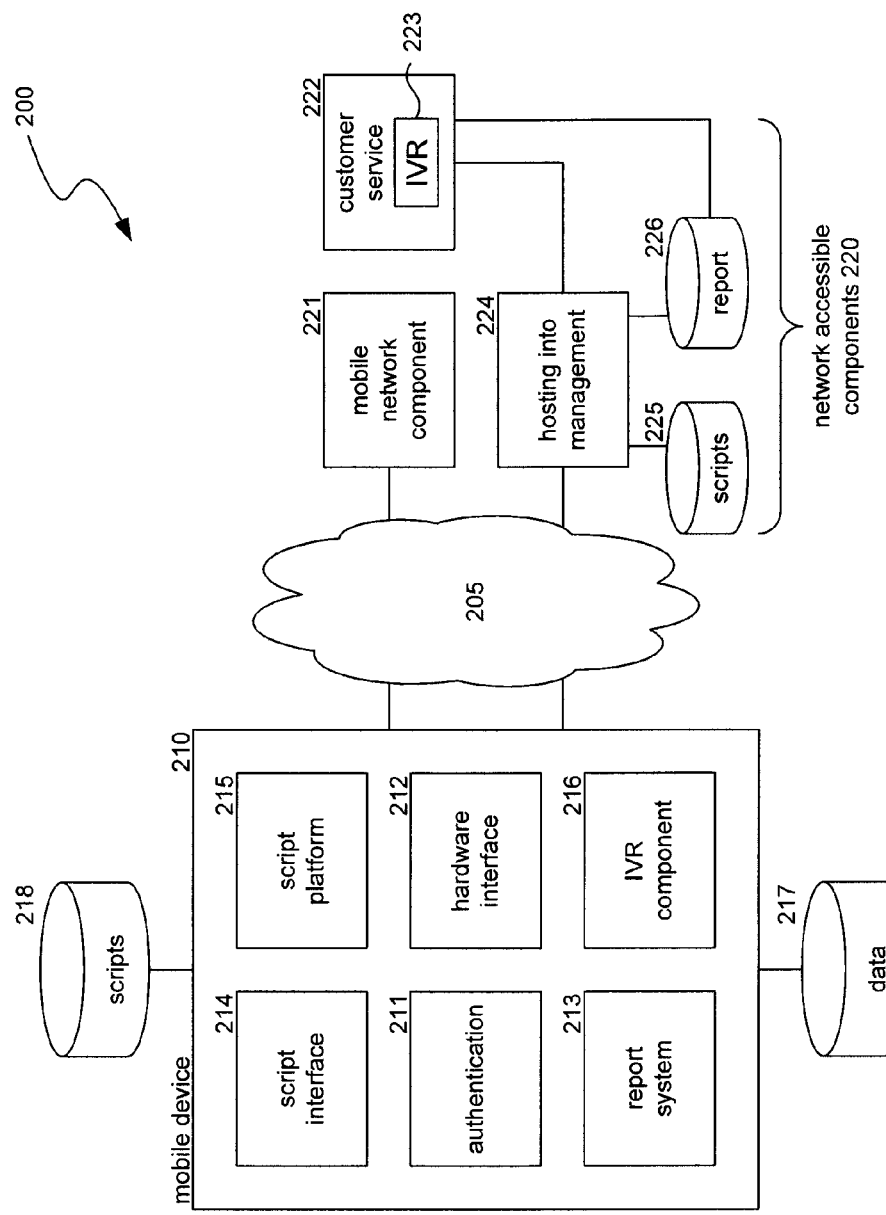
FIG. 2 is a schematic diagram illustrating a suitable environment for implementing interactive voice response navigation methods.

FIG. 2 illustrates an environment 200 in which IVR interaction methods may be implemented. The environment 200 may include components within a mobile device 210 and/or network accessible components 220 that communicate with the components within the mobile device via a network 205. The components within the mobile device 210 may include executable software, software configurations, hardware configurations and controls, and handset operating system interfaces. As disclosed herein, executable software may include, without limitation, any software program stored on the mobile device or associated memory device, both permanently and temporarily connected via hardware or wireless connectivity. The mobile device 100 may include an authentication system 211 (e.g., via a SIM), a hardware interface 212, a report system 213, a script interface 214, a script platform 215, an IVR interaction component 216, data 217, and scripts 218. The network accessible components 220 may include a mobile network component 221, a customer service component 222 which may include a IVR component 223, a host information management component 224, a database of updated scripts 225, and a database of report data 226.

The components within the mobile device 210 allow the device to provide and/or implement handset-based services and network-based services. The authentication component 211 may implement SIM (Subscriber Identity Module) card-based or standalone authentication to meet network requirements for desired levels of security. Authenticating a system to meet network requirements may not be required but is often recommended.

The hardware interface component 212 may retrieve or receive data regarding actions performed by the mobile device 210, status information regarding the functionality of the mobile device, and so on. For example, the component 212 may receive information related to changing volume, changing frequency, retrieving SIM (Subscriber Identity Module) ID, connection status from the SIM or radio hardware, and others. The report component 213 may collect and forward the data reported by the mobile device to the network 206. The report component 213 may also encrypt the handset identification information to provide increased security. For example, the report component may encrypt the information so that only the host information management component 224 can decipher any transmitted handset identification information.

The script interface 214 serves as a standard application programming interface for executing scripts 218. More specifically, the script interface 214 provides an interface between scripts 218 and the various hardware-specific and executable, program-specific functions. The script interface 214 allows a single customer service script to be deployed across multiple operating systems and hardware configurations. In addition, the script interface 214 includes a standard API (Application Programming Interface) for both the hardware/OS side and the script interface.

The script platform 215 authenticates, runs, and updates all scripts 218, manages reporting updates and changes, communicates with the host information management component 224, communicates with a GUI (Graphical User Interface), and manages customer surveys and interviews. The script platform 215 can mix and match calls through the script interface to acquire information, to change or correct settings on the phone, and to perform additional functions as described below. The host information management component 224 can push a notification to the script platform 215 via USSD (Unstructured Supplementary Services Data), SMS (Short Message Service), IP (Internet Protocol), or any other network connectivity that the mobile device supports. The script platform 215 can run the scripts 218 after authentication, and the scripts 218 can be authenticated to via the network accessible components 205 or to the phone. The scripts 218 may be any application, routine, snippet of code, binary sequence, binary code instructions, or other executable data that executes on the mobile device 210 to cause the mobile device to perform an action, such as to provide enhanced interaction with an IVR system.

The network accessible components 220 enable the mobile device 210 to communicate with and to retrieve data from outside the device, such as from a customer support center having an IVR system. The network accessible components 220 may include wired and wireless components. The mobile network component 221 may perform many services, including billing, CRM (Customer Relationship Management), provisioning, and others. Furthermore, the mobile network component 221 may return data calls made by mobile devices via standard network protocols (e.g., IP, DTMF (Dual Tone Multiple Frequency), SMS, USSD, etc.).

The mobile network operator customer service component 222 may also consist of one or more systems relating to customer service, including billing, CRM, provisioning, and others. The customer service component 222 may also include an IVR component 223 that receives voiced communications (or other audio communications) from a user of the mobile device 210 and responds to the voiced communications. The host information management component 224 controls interactions between the mobile device 210 and the customer service component 222. The host information management component 224 may transmit updates to the mobile device 210. The mobile device 210 typically employs a unique handset ID or serial number, and a mobile phone number. The report data database 226 provides storage for report information gathered from the mobile device 210. The updated scripts database 225 stores scripts that the customer service component 222 or other network accessible components provide to the mobile device. The updated scripts 225 database may be managed and versioned as desired by the host information management component 224, can be targeted at specific subscribers or groups of subscribers, and can include requests for reports and customer interview surveys.

Further details regarding components within the mobile device 210 and/or components accessible to the mobile device over a network may be found in U.S. patent application Ser. No. 11/672,499, filed on Feb. 7, 2007, entitled A METHOD AND SYSTEM OF ENHANCING VOICE CALLS, SUCH AS ENHANCING VOICE CALLS WITH DATA SERVICES, which is incorporated by reference in its entirety.

Figure 3:
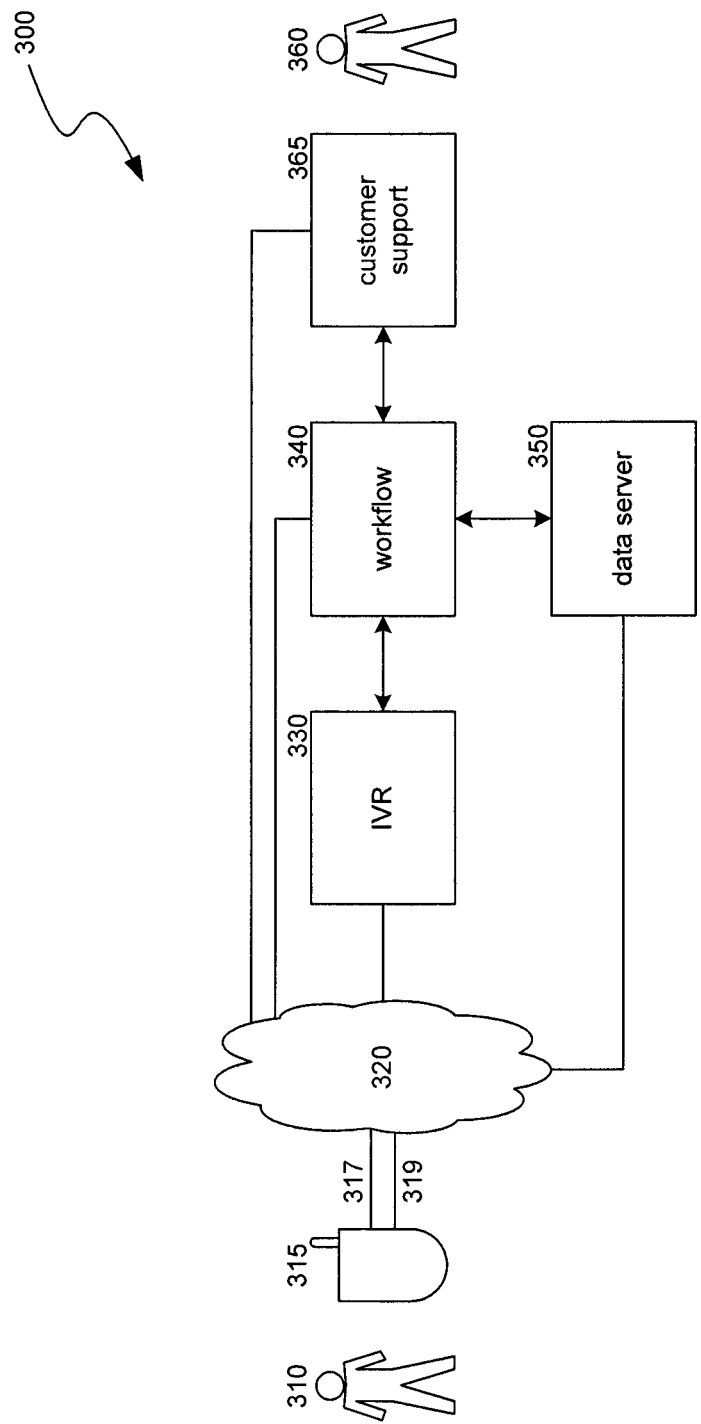
FIG. 3 is a block diagram illustrating an enhanced IVR system and the flow of data between elements.

Referring to FIG. 3, a block diagram illustrating an enhanced IVR system 300 is shown. A user 310 operates a mobile device or mobile equipment (ME) 315 running IVR enabling scripts (not shown). The user 310 and device 315 may use audio channels 317 and/or data channels 319 over a network 320 to connect to an IVR interaction component 330. The IVR interaction component 330 may transmit and/or receive data from a data server 350 or a customer support agent 360 utilizing a customer service center server 365 via a workflow component 340 that facilitates the exchange of data between the IVR interaction component 330 and other components within the system 300.

The enhanced IVR system 300 provides both voice-based and data-based services over some or all channels between system components 310, 315, 330, 340, 350, 360 and/or 365. For example, the user 310, via the mobile device 315, may transmit and receive audio-based communications from the IVR system 330 or the customer support agent 360. These communications may be voice communications or touchtone communications (such as DTMF tones, computer recognized voice grammar, computer recognized utterances, and so on). The mobile device 315 may also communicate with the IVR system 330 via DTMF tones or other recognized audio signals generated by scripts executing on the mobile device 315.

The IVR system 330 may communicate with the workflow component 340 via various data channels. For example, the workflow component 340 may run applications that act to facilitate communications between humans and computers. Examples include voice XML, CCXML, OpenVXI, and so on. The workflow component 340 receives audio-based data and converts that data to information understandable by the other components. Additionally, the workflow component 340 may also receive data-based information from the other components and convert that information to voice-based data.

In some cases, the mobile device 315 may communicate directly with the workflow system 340 or with customer support data server 350 over data channels 319.

Figure 4A:
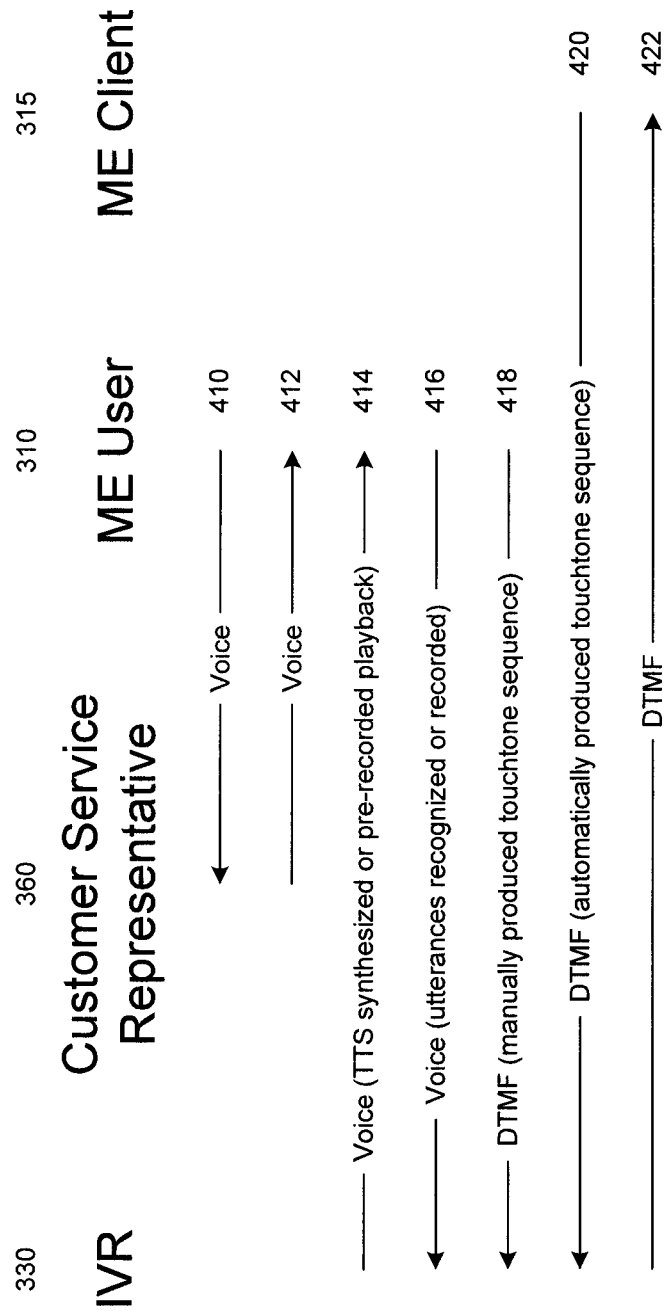
FIGS. 4A-B are data flow diagrams illustrating data and voice transmission channels between network elements.
Figure 4B:
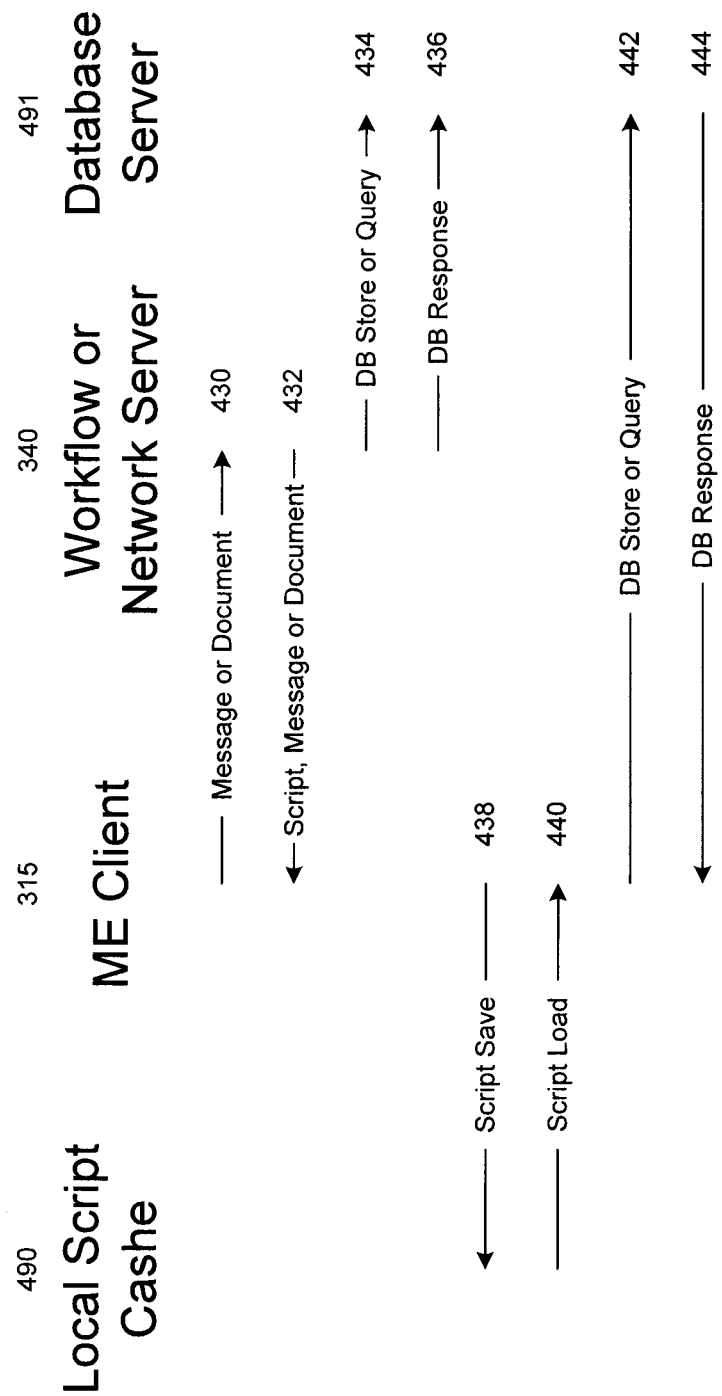

Referring to FIGS. 4A-B, data flow diagrams illustrating data and voice transmission channels between network elements are shown. For example, FIG. 4A illustrates example analog transmission types between network components, such as IVR system 330, the customer service representative 360, the user 310, and/or the mobile device 315. The user 310 may communicate to a customer service representative 360 via a voice channel 410. The customer service representative 360 may communicate to the user 310 via voice channel 412. The IVR system 330 may communicate to the user via a voice channel 414. The voice channel 414 may use TTS synthesized communications or prerecorded playback. The user 310 may communicate to the IVR system 330 via a voice channel 416. Utterances or other spoke grammar may be recognized and/or recorded by the IVR system 330. The user may also communicate to the IVR system 330 via a voice channel 418 using DTMF tones. The DTMF tones may be manually produced by the user (such as the user pressing buttons on a keypad). The mobile device 315 may communicate to the IVR system 330 via a voice channel 420 using DTMF tones. The DTMF tones may be automatically produced by the script running on the mobile device 315. The IVR system may communicate to the mobile device 315 via voice channel 422 using DTMF tones.

Alternatively, or additionally, transmission channels may be digital channels. FIG. 4B illustrates example digital transmission types between network elements, such as a local script cache 490 on the mobile device 315, a mobile device 315, a workflow or network server 340, and a database server 491. For example, mobile device 315 may send messages or documents over channel 430 to workflow or network server 340. The server 340 may send scripts, messages, or document over channel 432 to the mobile device 315. The server 340 may use channel 434 to store data in database server 491 or query database server 491. The database server 491 may respond via channel 436. The mobile device 315 may save scripts to a local scripts database 490 via channel 438 and may load scripts from database 490 via channel 440. The mobile device 315 may also store data to database server 491 via channel 442 or may query database 491 via channel 442. The server 491 may respond to queries via channel 444.

Interacting with Voice Response Systems

The system described herein provides mobile devices and users of mobile devices enhanced functionality when interacting with voice recognition systems. Such enhanced functionality may include efficient user interfaces, automated repairs or updates of components of the device, automated responses, and so on. For example, the system allows users of mobile devices to visually interact with an interactive voice response (IVR) system while also verbally interacting with the IVR system (or in some cases instead of verbally interacting with the system). During such an interaction, the system may perform background tasks, such as repairing configuration problems, providing information to be later used in presented tutorials about a feature of the mobile device, and so on.

Scripts running on a mobile device allow an interactive voice response (IVR) system to perform actions on the mobile device. In some cases, one or more scripts (such as those described herein) enable a mobile device to receive commands from an IVR system over a voice or data channel communicatively linking the mobile device and the IVR system. These IVR system originating commands may cause actions to be performed on the mobile device, such as coordinating content displayed to the user via a graphical user interface (GUI) with voiced commands received from the IVR system. The content displayed to the user may be stored on the mobile device, transmitted from the IVR system, or retrieved from another network location. The mobile device, via executing scripts, may also send commands back to the IVR system or to other associated components.

In some cases, scripts running on the mobile device may initiate the dialing of an IVR number (such as a number known to be associated with an interactive voice response system). Once connected to the IVR system associated with the dialed number, the scripts may then communicate with the IVR system by sending dual tone multiple frequency (DTMF) tones to the IVR system. In some cases, the scripts use the DTMF tones to cause the IVR system to transmit voiced commands back to the mobile device.

Figure 5A:
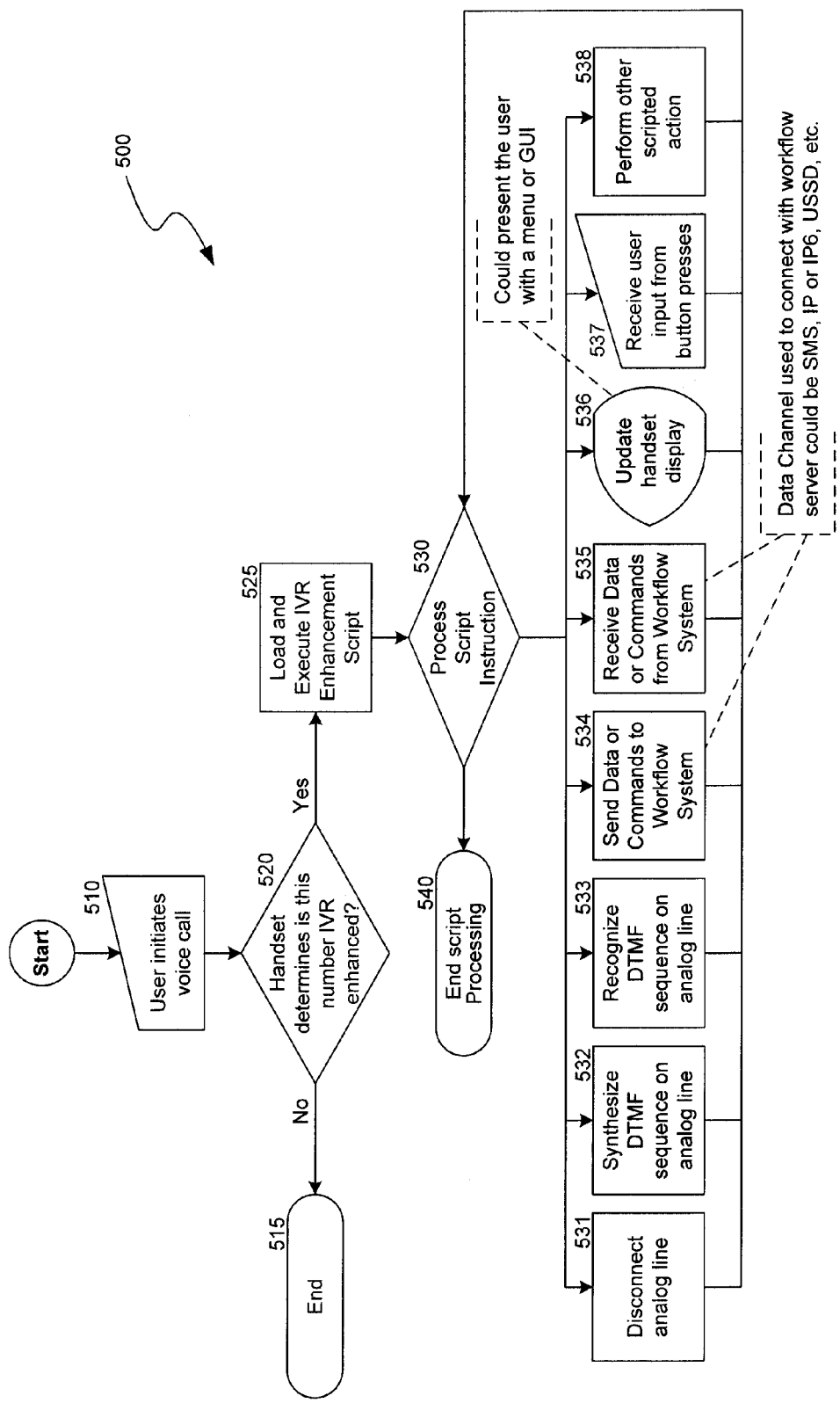
FIG. 5A is a process flow illustrating an interaction between one or more scripts running on a mobile device and an interactive voice response system.

Referring to FIG. 5A, a process flow illustrating an interaction between scripts running on a mobile device and an interactive voice recognition system is shown as routine 500. In block 510, a user of a mobile device initiates a voice call (such as dialing a number and pressing "connect"). In decision block 520, the system determines if the destination number of the voice call is IVR enhanced (that is, if the number provides IVR capabilities and/or may be enhanced with script instructions). If the system determines the number is not IVR enhanced, the routine proceeds to block 515, else the routine proceeds to block 525. At block 515, when the number is not IVR enhanced, the routine ends and the voice call proceeds as a typical voice call. Details describing the determination of voice enhanced numbers will now be discussed with respect to FIG. 6A.

Figure 6A:
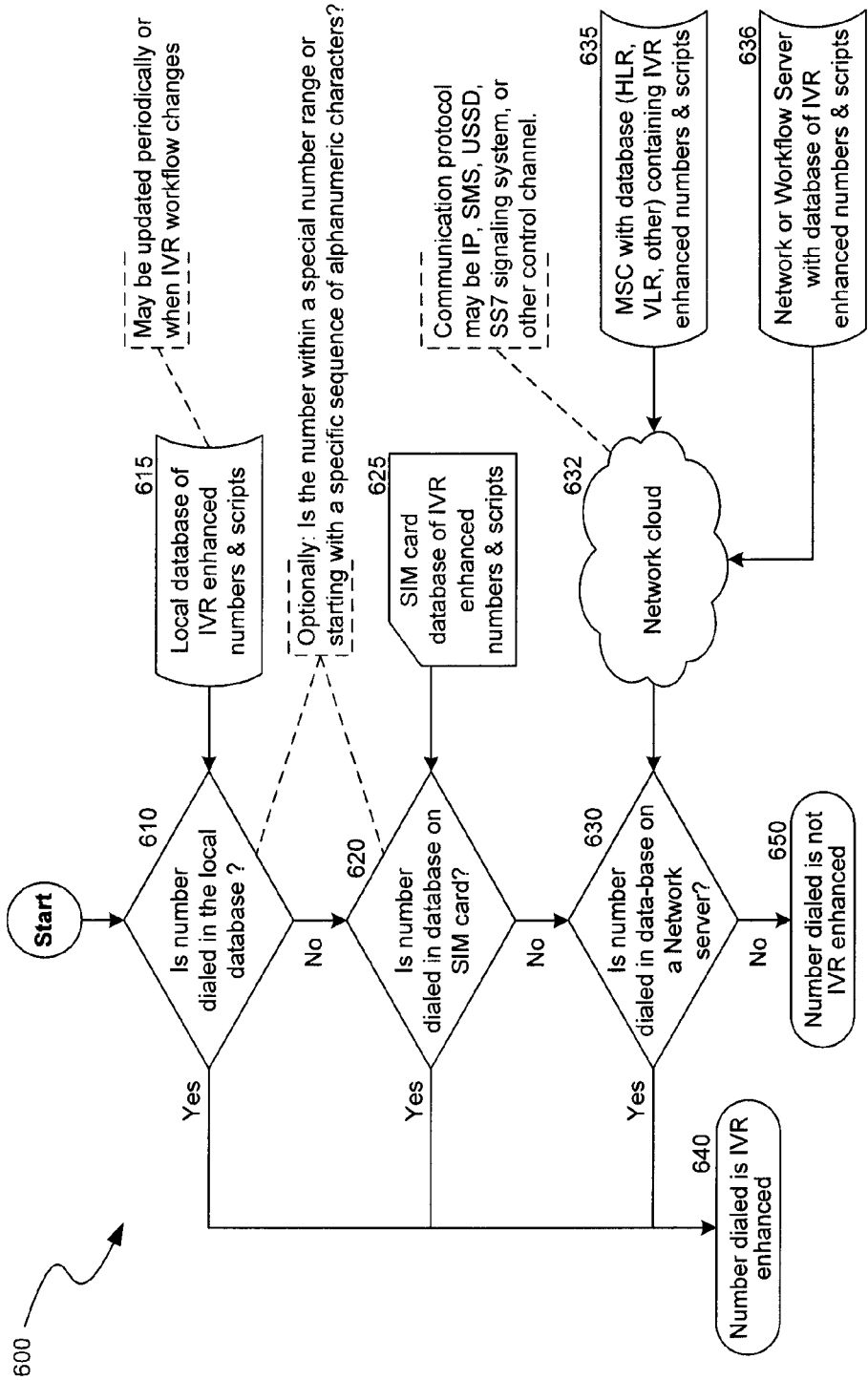
FIG. 6A is example process flow for determining if a dialed number has enhanced voice capabilities.

Referring to FIG. 6A, an example process flow for determining if a dialed number has enhanced voice capabilities, such as in block 520, is shown as routine 600. Upon detecting a dialed number, the system, in block 610, looks to a local database 615 of IVR enhanced numbers and scripts and attempts to match the number with one of the locally stored numbers. Alternatively, or additionally, the system may compare the dialed number with a range of numbers (such as a range of numbers known to be voice enhanced) or may look to a portion of the number itself (such as looking at the number for a specific sequence of alphanumeric characters). The database 615 may be in the local memory of the mobile device. The system may periodically update the database 615 after IVR workflow changes, IVR communications, and so on.

If the system matches the dialed number a number stored in the local database 615 (or matches a range of numbers or numbers having a certain sequence of characters), the routine 600 proceeds to block 640 and the system determines the dialed number is voice enhanced.

If the number is not stored in the local database 615 (or, does not otherwise indicate voice enhancement), the routine 600 proceeds to block 620. In block 620, the system looks to a database 625 of IVR enhanced numbers and scripts contained on a SIM card and attempts to match the dialed number with one of the numbers stored in the SIM card database 625. Further details with respect to the storage of numbers and/or scripts on SIM cards are discussed in commonly assigned PCT Application No. US2007/080351, filed on Oct. 3, 3007, entitled SYSTEMS AND METHODS FOR STORING OR PERFORMING FUNCTIONS WITH REMOVABLE MEMORY, SUCH AS A SUBSCRIBER IDENTITY MODULE OF A MOBILE DEVICE, which is incorporated by reference in its entirety. Of course, numbers could be stored elsewhere in the device.

If the dialed number is matched to a number stored in the SIM database 625 (or is matched to a range of numbers or numbers having a certain sequence of characters), the routine 600 proceeds to block 640 and the system determines the dialed number is voice enhanced.

If the number is not stored in the SIM database 625 (or, does not otherwise indicate voice enhancement), the routine 600 proceeds to block 630. In block 630, the system looks to a database 635 and/or a database 636 contained at a network server and attempts to match the dialed number with a number stored in one of databases 635, 636. The system may connect with the databases over a network 632, such as the Internet or other network. The system may look to a public database, such as a mobile service center (MSC) having a database 635. Database 635 may be an HLR, a VLR, or other public or accessible databases. The system may also look to a server specific database 636 (at a customer support server or at the workflow server, and so on) that contains additional known IVR enhanced numbers and scripts. If the system matches the dialed number to a number stored in one of the network databases 635, 636, the routine 600 proceeds to block 640 and the system determines the dialed number is voice enhanced. If the number does not match, the routine proceeds to block 650, and the system determines the dialed number is not voice enhanced. Of course, the system may employ other methods when determining if a number is IVR enhanced. For example, different combinations of steps 610, 620, and/or 630 may be employed by the system.

Referring back to FIG. 5A, at block 525, when the system determines the number is voice enhanced, the system loads and executes one or more scripts related to IVR communications. In block 530, the system processes the script. In processing the script, the system may perform some or all of the actions or functions described in blocks 531-538. The system may perform the described actions in various sequences and orders, other than those shown in FIG. 5A.

The system may, in block 532, synthesize a DTMF or other type of tone sequence, play back other audio such as a prerecorded audio file, or perform other audio-based actions on an analog line. The system may, in block 533, recognize and/or interact with a DTMF tone sequence (or other audio transmissions, such as human voice) received on an analog line. The system may, in block 534, send data or commands to a workflow server. The system may, in block 535, receive data or commands from a workflow server. In sending and/or receiving data or commands from a workflow server, the system may connect with the workflow server over a number of data channels, such as an SMS channel, an IP or IP6 channel, a USSD channel, and so on.

The system may, in block 536, update a display or other GUI on or related to the mobile device. For example, the system may present a user with a menu on the GUI related to audio communications received from the IVR system. The system may, in block 537, receive user input from button presses, soft button presses on a GUI, and so on. In block 538, the system may perform other scripted or enhanced actions (such as other actions described herein). Additionally, the system may, in block 531, disconnect an analog connection line as one of the actions. Once script instructions are processed and actions are performed, the routine proceeds from any or all of blocks 531-538 to block 540, and the system ends script processing.

Figure 5B:
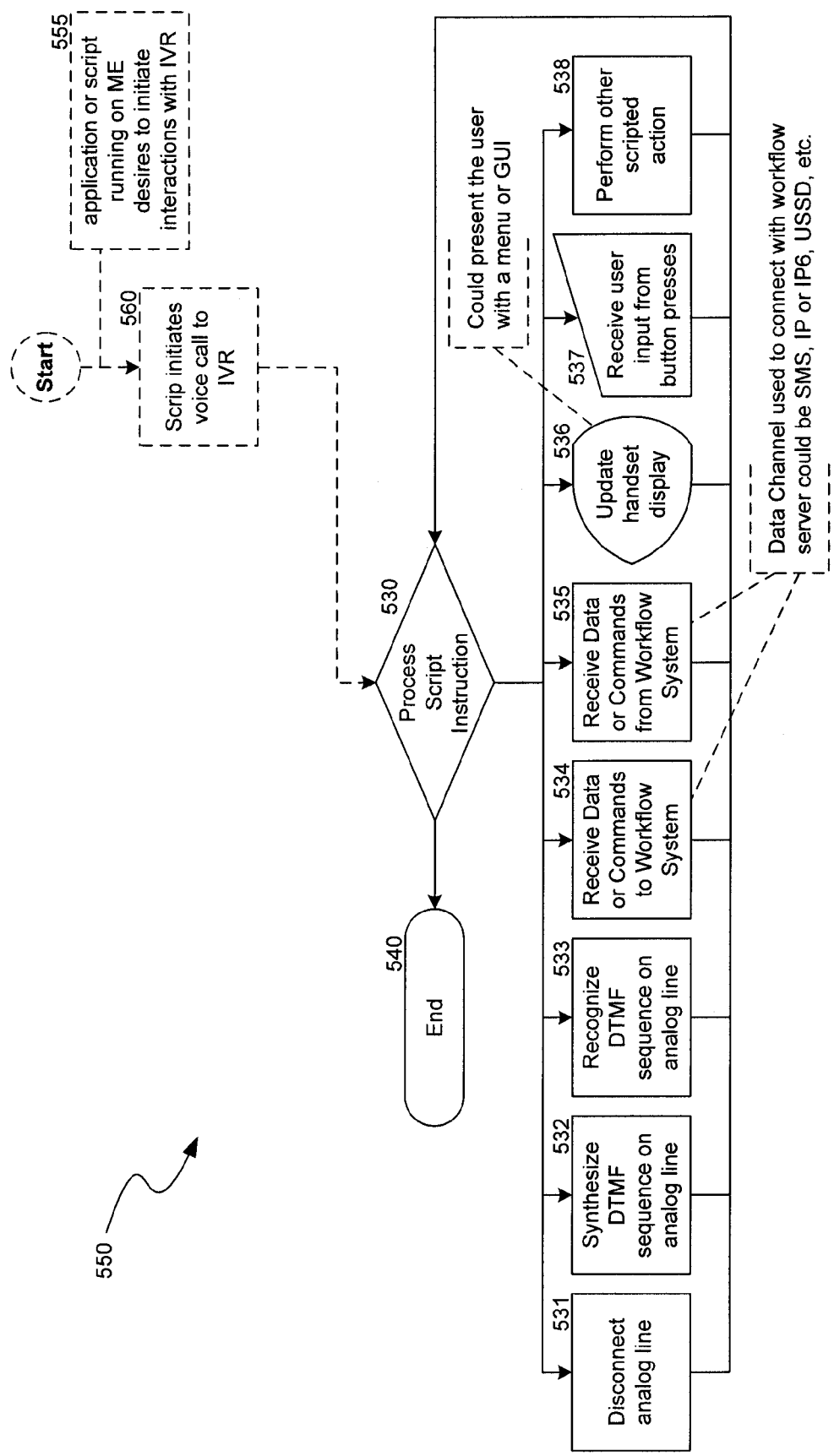
FIG. 5B is a process flow illustrating an alternative interaction between scripts running on a mobile device and an interactive voice response system.

Referring to FIG. 5B, a process flow illustrating an alternative interaction between scripts running on a mobile device and an interactive voice recognition system is shown as routine 550. In this example, in block 555, an application or script running on a mobile device wishes to interact with an IVR system. For example, a script running on the mobile device may detect an incorrect configuration and attempt to automatically notify the workflow server without alerting the user. In block 560, the system initiates a voice call to the IVR system, and the routine proceeds to block 530, where the script processing described above begins.

In some cases, the application or script sends data to a workflow server before initiating the voice call to the IVR system, and appends a unique identifier that provides identification information to the called number of the IVR system. The identifier may identify a database entry in the workflow server, the device, the SIM, and/or other related components. For example, the application may send diagnostic information related to the configuration of the device to the workflow server, and initiate a call to a customer assistance number to correct the configuration. Once called, the IVR system determines the identity of the mobile device using the identification information and retrieves the diagnostic information sent to the workflow system. The IVR system may receive instructions from the device to transmit an audio-based menu of options over the voice channel to allow the user to better understand the problem, take action to correct the problem by sending commands to the workflow component, or to perform other actions. Further details related to workflow servers and identifiers will be described herein.

Figure 6B:
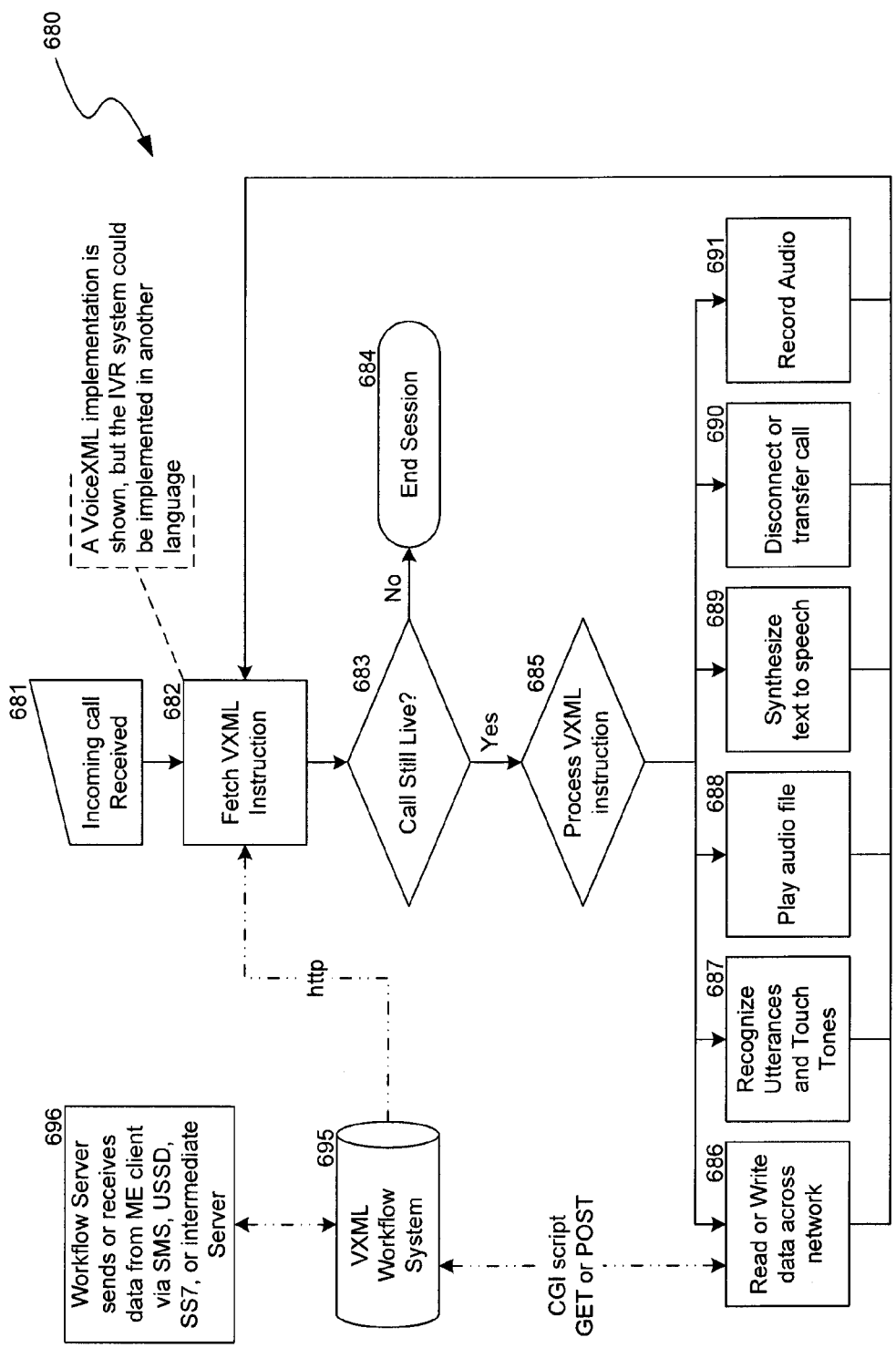
FIG. 6B is a process flow illustrating interactions between an IVR system and other components upon receiving a call from a mobile device.

Referring to FIG. 6B, a flow diagram illustrating interactions between the IVR system 330 and other network components upon receiving a call from a mobile device is shown as routine 680. In block 681, the IVR system receives an incoming call, such as a call from a mobile device running an IVR enhancement script. In some cases, the system receives an identifier along with the incoming call, such as extended dialing digits with caller ID information. Further details with respect to unique identifiers will be described herein.

In block 682, the system fetches instructions, such as VXML instructions. Although VXML instructions are shown in this example, the instructions may be implemented in other languages. In some cases, the system may communicate, via http or other channels, with a workflow server when fetching instructions. The workflow server may send or receive data from the mobile device over a data channel (such as an SMS channel, a USSD channel, an SS7 channel, an intermediate server such as customer support data server 350, and so on).

In block 683, the IVR system determines that the incoming call is still connected, and proceeds to block 685, else proceeds to block 684 and ends. In block 685, the system processes the fetched instructions. The processed instructions may initiate some or all of the actions shown in blocks 686-691. The system may initiate the actions in orders or sequences not shown in FIG. 6B.

In block 686, the instructions may cause the system to read or write data across the network. The system may use data sent or received in blocks 695 and 696 when reading or writing data. The system may also retrieve CGI scripts (such as those returned by GET, POST, and so on). Additionally, the system may perform other actions not shown in FIG. 6.

In block 687, the instructions may cause the system to recognize received utterances and touch tones (such as DTMF Tones). Caller ID or extended dialing digits may also be recognized to identify a caller or to recognize a unique identifier used to retrieve a data record stored on a workflow server. In block 688, the instructions may cause the system to play an audio file. In block 689, the instructions may cause the system to synthesize text to speech. In block 690, the instructions may cause the system to disconnect or transfer a call. In block 691, the instructions may cause the system to record some or all of an audio stream. After performing some or all of the actions in blocks 686-691, the routine proceeds to block 920 to await further instructions. Additionally, other instructions may be performed, such as mathematic, conditional, and/or logic operations, and so on.

An example of enhanced IVR navigation, as discussed above, will now be described. In this example, a mobile phone user wants to change his/her billing address. He dials his service provider's customer service number, such as "611."

The dialing of the number (or, when the device receives an indication that the user is attempting to connect to the number) triggers a script running in a background layer of the user's mobile device. The script scans a local database of IVR enhanced numbers for the dialed number. In this example, a match is found, and an associated IVR enhancement script loads and performs relevant actions.

At the destination, associated with the number, an IVR system answers the call with a prerecorded message. In this example, the system plays the following message to the user: "Welcome to Vector Mobile customer support." At this point, there may be a brief pause to allow the mobile device script to load and prepare for response.

The script, at the mobile device, synthesizes and sends a DTMF sequence to the IVR system that indicates to the IVR system the user's number (or, other identification information) and that the script is active on the mobile device.

The IVR system receives the DTMF sequence, decodes the user information (such as user account information, user login information, and so on), determines that the mobile device is running an IVR enhancement script, and plays another prerecorded message to the user, such as: "Dear Mr. Smith, please make a menu selection by either saying the desired menu option or look to your phone's display to see the options graphically." The IVR system then voices the menu options for the user and/or causes the mobile device to graphically present related menu options to the user via the user's mobile phone display.

The user sees the menu option "change my billing address" on the mobile phone's display, and selects the option using a directional button and/or softkey navigation.

The IVR system receives the menu selection by the user, sends the user a change billing address form to the user's display, and terminates the voice connection. The user then fills in the form using softkey navigation, and sends the form to a workflow server associated with the IVR system. For example, the running script sends an SMS message containing the address request change and the new address to the workflow server after receiving the form information from the user. The workflow server validates the address as a valid address and sends an SMS message to the mobile device signaling the validation of the address.

Upon receiving the return SMS message, the script dials a phone number, such as "6112345," and displays to the user a message such as "Now connecting with a customer service representative to verify your address. Please listen."

A customer service representative answers the call. At or near the same time, the representative receives information about the user and information about how to verify the user (such as the user's password, social security number, mother's maiden name, and so on). The representative uses the received information and verifies the user.

Upon verification, the customer service representative sends the updated billing address to a business support system. The customer service representative also causes an SMS message to be sent to the mobile device. The script may then receive the message, update the mobile device address book, and display a message to the user, such as: "Address update completed. Thank you for using Vector Mobile." The script then terminates.

Figure 7A:
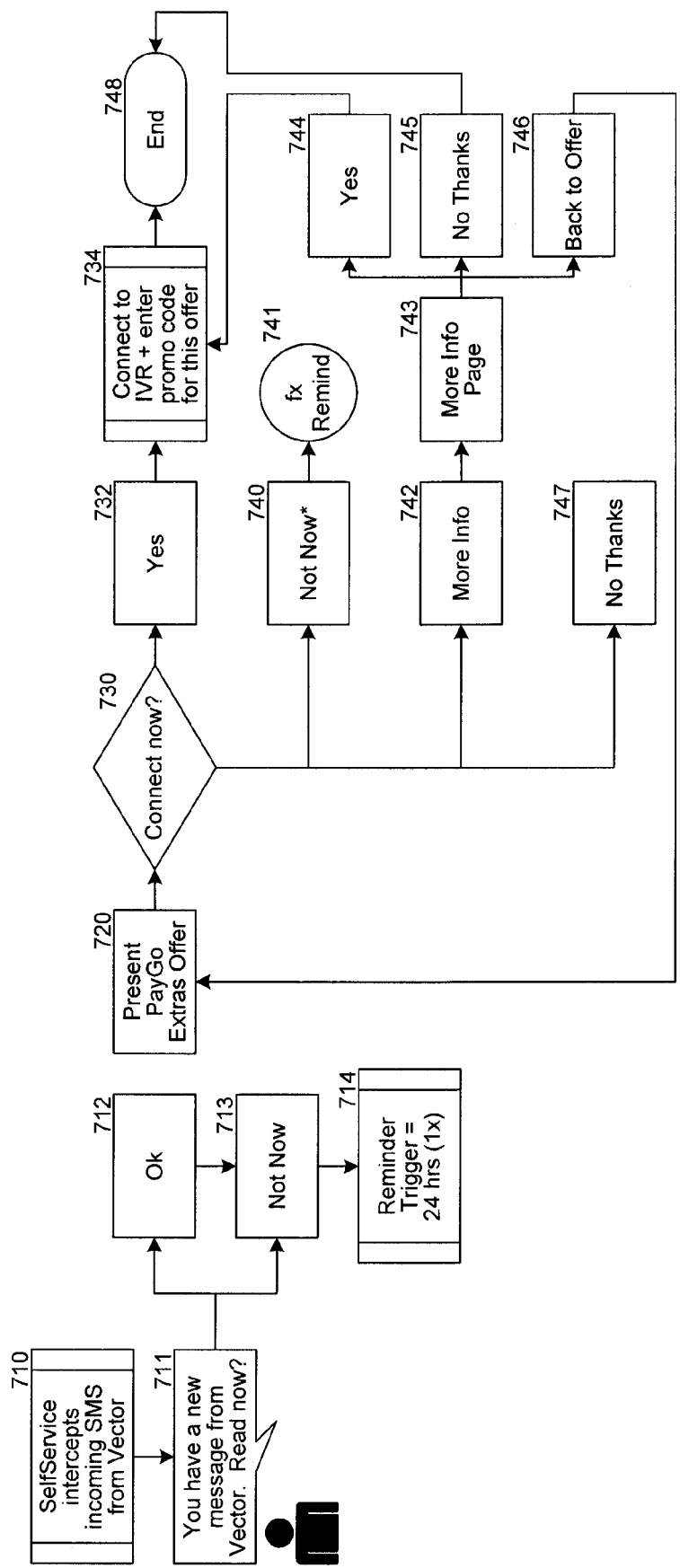
FIG. 7A is an example process flow illustrating a script initiating interactions with an IVR system.
Figure 7B:
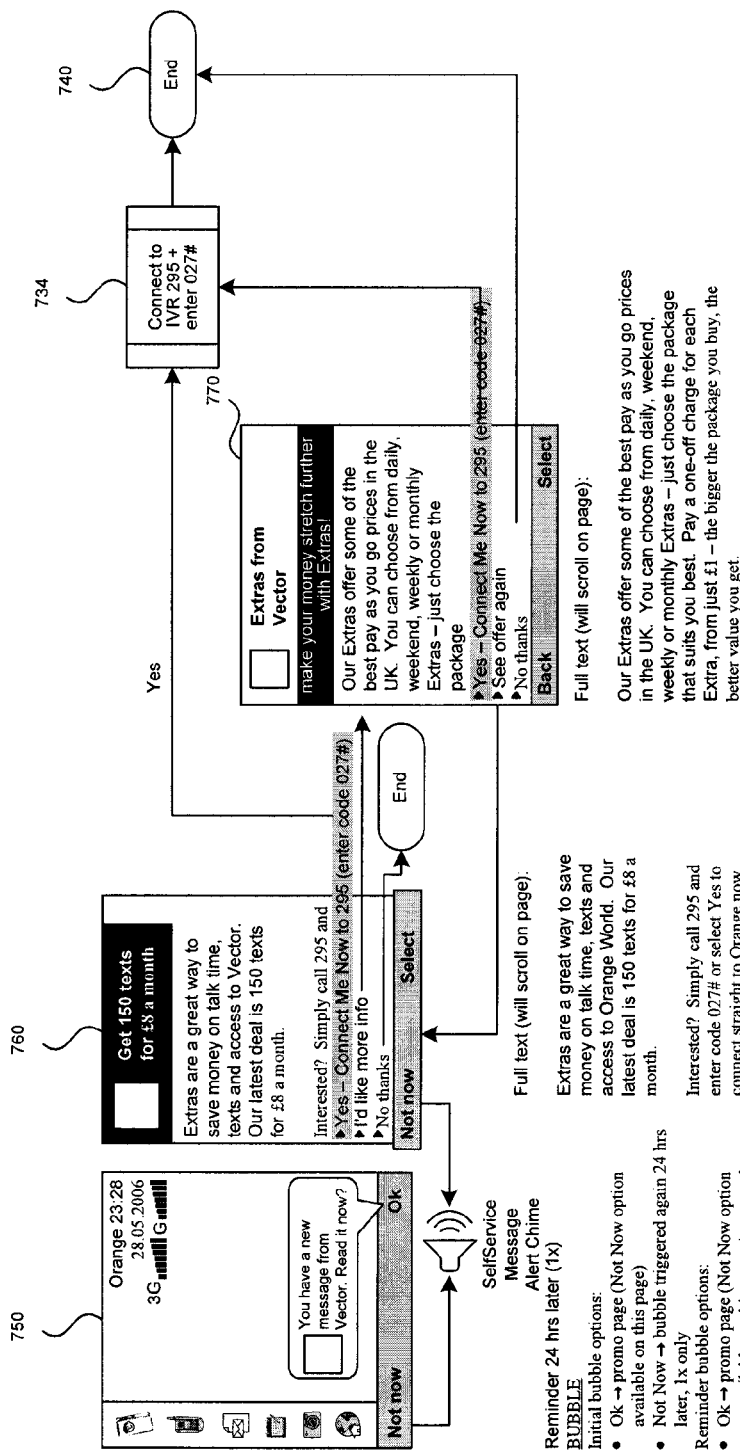
FIG. 7B is an example of display screens used in the example of FIG. 7A.

FIGS. 7A-B present additional examples of enhanced IVR navigation. Referring to FIG. 7A, an example process flow illustrating the initiation of a call to an IVR associated number by a script is shown as routine 700. In this example, in block 710, a script running on the mobile device intercepts an SMS from the user's service provider to the user. The script may display an indication to the user, such as display balloon 711, asking the user if he/she would like to read the message. Upon receiving a positive indication 712 from the user, the routine proceeds to block 1720. Upon receiving a negative indication 713, the routine ends and sets a reminder 714 to trigger the user at a later time.

In block 720, the device presents the message to the user. In this example, the message relates to a special offer from the service provider. In decision block 730, if the user wishes to connect to the offer (i.e., the system receives a positive indication from the user 732), the routine proceeds to block 734, else the routine proceeds to block 740, 742, or block 743. In block 740, the user indicates that he/she is not interested at that time, and the system, in block 741, triggers a reminder, and ends. In block 742, the user indicates a request for more information, and the system may send the user an information page 743. The user may then input a positive indication 744, a negative indication 745, or may indicate a return 746 to the offer. In block 747, the user indicates a lack of interest in the offer, and the routine ends 748.

In block 734, the device, after receiving a positive indication from the user in blocks 732 or 744, initiates a voice call to an IVR system 330 and enters a promotional code for the offer. In some cases, the system will enter the IVR enhanced number and the promotional code for the user. For example, the system may enter the promotional code using DTMF tone sequence synthesis.

Referring to FIG. 7B, an example of display screens used in the example of FIG. 7A is shown. Referring to FIG. 7B (and other screen displays), representative phone or computer displays, or web pages, are shown for performing certain tasks described herein. The screens provide facilities to receive input data, such as a form with field(s) to be filled in, menu selections, pull-down menus or entries allowing one or more of several options to be selected, buttons, sliders, hypertext links or other known user interface tools for receiving user input. While certain ways of displaying information to users is shown and described with respect to certain Figures, those skilled in the relevant art will recognize that various other alternatives may be employed. The terms "screen," "web page" and "page" are generally used interchangeably herein.

The screens may be stored as display descriptions, graphical user interfaces, or other methods of depicting information on a computer screen (e.g., commands, links, fonts, colors, layout, sizes and relative positions, and the like), where the layout and information or content to be displayed on the page is stored in a database. In general, a "link" refers to any resource locator identifying a resource on a network, such as a display description provided by an organization having a site or node on the network. A "display description," as generally used herein, refers to any method of automatically displaying information on a computer screen in any of the above-noted formats, as well as other formats, such as email or character/code-based formats, algorithm-based formats (e.g., vector generated), Flash format, or matrix or bit-mapped formats.

Displays 750, 760 and/or 770 may be used in providing instructions to the user in the above example. For example, screen 750 may be used in collaboration with block 711. Screen 760 displays the promotional offer, such as in block 720. Screen 770 displays information about the offer, such as in block 743. In this example, the system initiates and completes a voice call to an IVR system without the need for the user to dial the IVR phone number and wade through slow and/or tedious IVR menus. The user does not need to listen to an IVR voice channel, or provide utterances, other voiced input, or touch tone button sequences which are acceptable to the IVR. The graphical menu functionality in this example may also be implemented on top of an already existing IVR and workflow system, with little or no modification necessary to the IVR or workflow system.

Providing Information to an IVR System

In some examples, the methods described herein may expand the use of an interactive voice recognition (IVR) system. The IVR system may gather or receive data or other information from a mobile device, from workflow servers or other associated components, and provide the data to a representative or other IVR components upon receiving a call from a mobile device.

In some examples the methods are able to recognize a mobile device from information received via a called number, such as a customer service number. They may provide information in or with the called number via a unique identifier, enabling a customer service representative or automated voice response system to receive information about the mobile device when called.

A unique identifier is any string of digits or values capable of identifying a mobile device from other mobile devices. The system may generate a unique identifier in a variety of ways, or utilize device related identifiers. In some cases, the system may use a mobile device identifier such as an International Mobile Equipment Identity (IMEI) or an Electronic Serial Number (ESN). An IMEI is an identifier of a GSM device unique across all GSM devices, and may be 16 decimal digits long. An ESN uniquely identifies a CDMA phone and may be 10 digits long. In other cases, the system may use the mobile device's phone number as a unique identifier.

In some cases, the system components may generate identifiers. For example, a server associated with a service provider or manufacturer of the mobile device may generate identifiers and communicate them to the device over a data channel. The server may generate identifiers in a variety of ways that enable the identifier to act as a database key. For example, the server may generate a sequence of numbers as the identifier.

Figure 8:
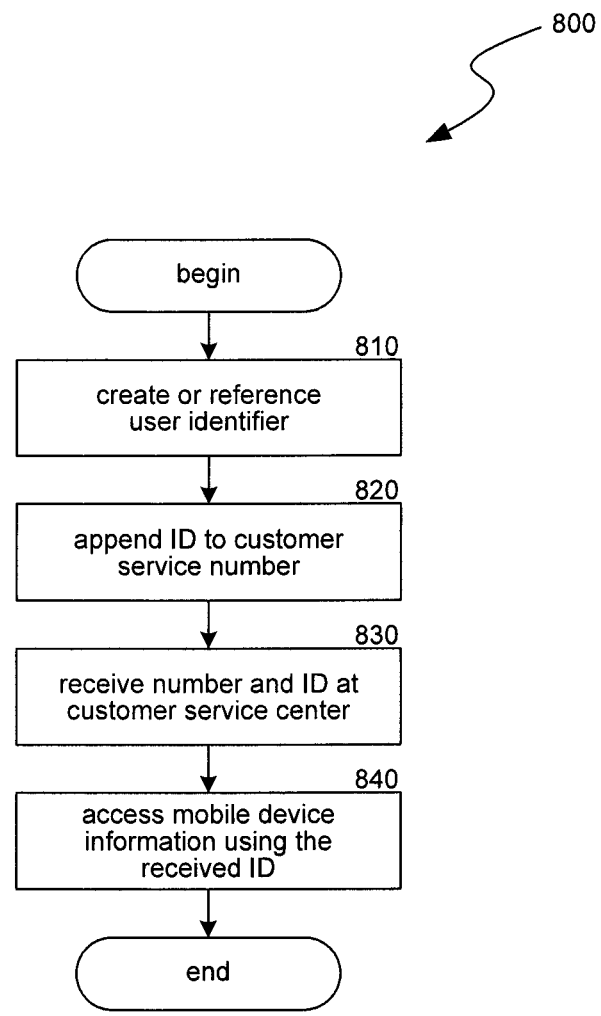
FIG. 8 illustrates a routine for accessing mobile device information via unique identification.

Referring to FIG. 8, a routine 800 for accessing mobile device information via user identification is shown. In step 810, the device creates or retrieves a unique identifier, such as a global unique identifier (GUID) upon initiation of a voice call from a user. In some cases, the device may determine the user has dialed a customer service number using the call intercept methods described herein, and initiate a script to retrieve the unique identifier for the user.

In step 820, the device appends the unique identifier to the dialed customer service number and places the voice call. In some cases, the device appends the unique identifier to all dialed numbers. In some cases, the device appends the unique identifier to numbers associated with facilities capable of processing extended numbers. An extended number may refer to a number containing the dialed number of a called party plus an appended unique identifier. In some cases, the device uses some of the methods described herein to determine if the number is capable of receiving extended numbers.

In step 830, a customer service center (or other facility) receives the extended number. In step 840, the customer service center accesses information about the device related to the received unique identifier. The customer service center may receive such information before the call was received and may retrieve such information using the unique identifier. For example, the customer service center may contain a database relating unique identifiers for mobile devices and corresponding status or other reporting information. Upon receipt of a call and appended unique identifier, the customer service center is able to match the received unique identifier with a similar stored unique identifier and retrieve information about the mobile device. The retrieved information may be diagnostic information retrieved from the device or received from the device. For example, a workflow server within the customer service center may launch or run a script on the device that performs diagnostics or other information gathering and transmits such information to the database. The customer service center may then relate the transmitted information to a unique identifier of the device and store the information in the database. Thus, the system enables a representative at a customer service center or an interactive voice response system to receive dynamically or recently updated information about the characteristics or status of a mobile device (and/or associated calling party) before a (simulated) voice conversation occurs.

Customer service calls may be shorter and more effective as a result of representatives and IVR systems receiving information from the user identifiers, as they may be able to diagnose problems without receiving much information from users. For example, a service provider may modify or selectively determine what information to retrieve upon receipt of a unique identifier, and tailor what options/instructions to present to a user with an IVR system. Additionally, the identifiers may facilitate or enhance simulated voice communications between mobile devices and IVR systems because the identifiers enable the IVR system to retrieve supporting information that may normally be provided by a user of the mobile device. For example, the IVR system may retrieve historical information about previous calls, historical information about the device or caller, and so on.

Figure 9:
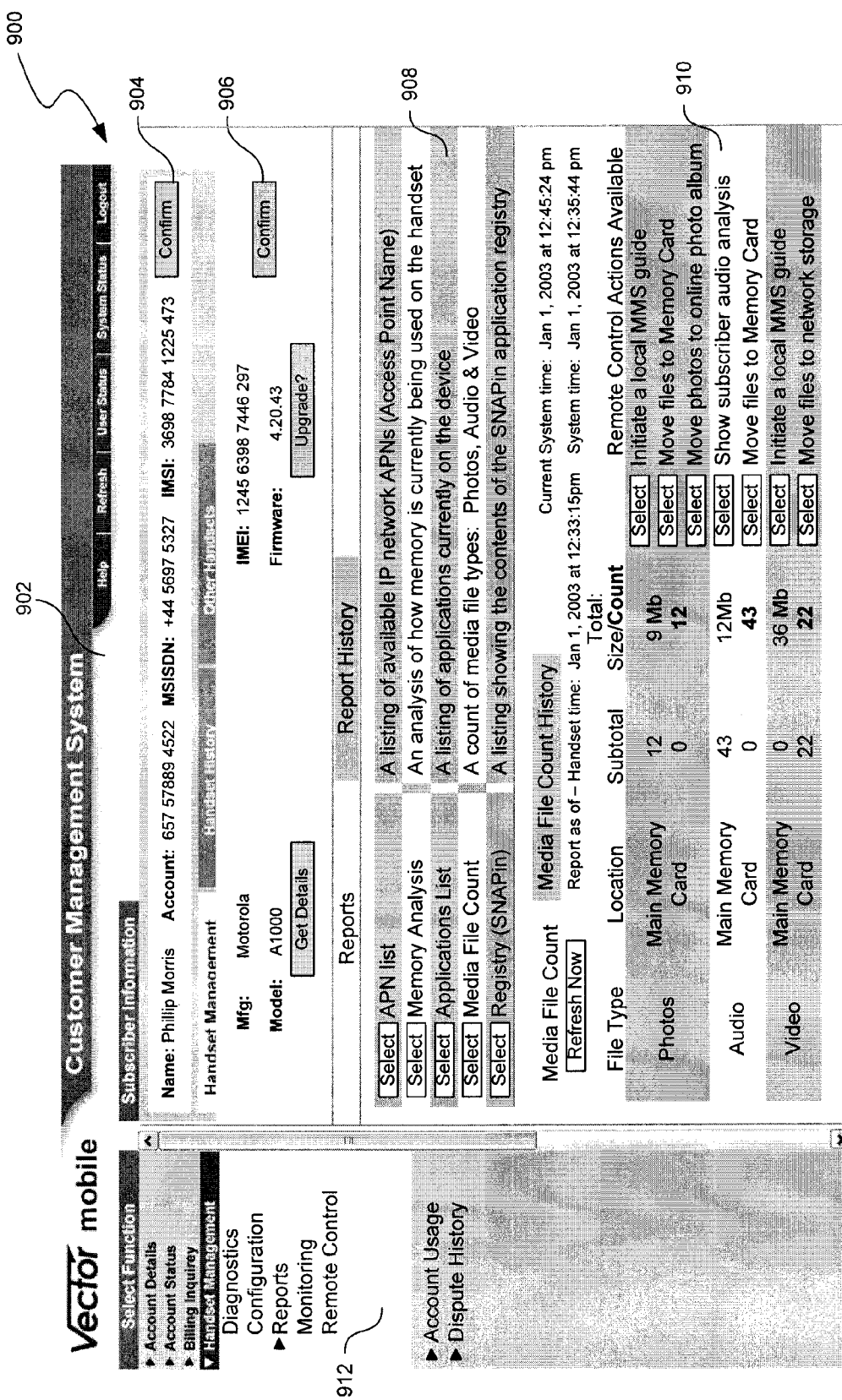
FIG. 9 is an example of a computer display showing device information and configuration data as used by a call center agent and/or IVR system.

Referring to FIG. 9, an example of a computer display showing device information and configuration data as used by a call center agent is shown. While on a call with a subscriber, the IVR system can, from his or her desktop computer, send diagnostic commands over the air to the mobile device. In response, the mobile device retrieves or gathers diagnostics and status information and sends them back to the agent's computer, via the network. In this way, the IVR system and supporting workflow system is able to correct problems on the first call with the subscriber, and the subscriber is never asked to perform tedious tasks or asked to call back on a land line. The IVR system may then select voiced options sent to the user or may display information on the user's display related to the diagnostic/status information and the voiced options based on the retrieved information.

As can be seen from FIG. 9, the system may also display, on a computer to a call center agent or on a user display, detailed information regarding the mobile device and its owner. A web browser or customer service display 900 includes a menu of options 912, report and history portion 908 (e.g., APN list, memory analysis, applications list, etc.), the name of the mobile device owner, the owner's account number and phone number, MSISDN (Mobile Station Integrated Services Digital Network) number, international mobile subscriber identity (IMSI), and details regarding the phone itself, such as the manufacturer, model number, firmware version, serial number, and IMEI (International Mobile Equipment Identifier). Other tabs, when selected, display the history of the handset, as well as other handsets associated with the subscriber, phone numbers, SIM, etc. As also shown in FIG. 9, the system can display a media file count 910 representing different types of files (e.g., photos, audio, video), the location of those files, the total number and size of the files, and so forth.

The call center agent or IVR system can initiate actions on the mobile device. For example, as shown in the media display portion 910, the call center agent may select a "Select" button to perform a "Move files to Memory Card" function that permits the call center agent to move files from the embedded memory on the mobile device to a removable memory card in the device. Other options include initiating a local multimedia messaging service (MMS) guide for the subscriber, moving photos to an online photo album, showing subscriber audio analysis, and so forth. Likewise, the call center agent or IVR system can select an appropriate button in the report/report history portion 908 to access a list of available IP network access point names, analyze how memory is currently being used on the mobile device, list applications currently loaded and/or running on the mobile device, count media file types (as shown in portion 910), and list the content of an application registry for the functionality described above.

The mobile device may be used to collect and to summarize data or metrics from the mobile device. Mobile device activity can be automatically logged and captured for periodic reporting to the network-based services. Collected data may be used to determine which applications are being used and how often users are accessing them. The collected data can be used with performance engineering systems and can gather business intelligence from rich device resident data or metrics.

The gathering of such mobile device metrics begins by the network operator defining data for collection. All mobile device activities can be locally logged or cached on the mobile device and periodically provided back to the network. Such logged data can include network events and messages. Over-the-air scripts provided by the network operator to the mobile device can instruct the device on what metrics to gather and with what frequency. For example, the service provider may program the mobile device to periodically (e.g., monthly) report to the network a status of installed executable program and their functional status. The status of the executable programs can be performed via an API (application programming interface) function called by the reporting system.

Through these scripts stored on the mobile device, user and network data is stored locally for periodic reporting, and the collection may conform to the network operator's privacy policy, while being invisible to the subscriber. Available database and reporting tools may import and use the periodically reported data. Such reporting tools may generate reports formatted for including business intelligence and data warehouse or data mining. As a result, such data easily augments network performance engineering systems. In general, the following is a list of some metrics that may be collected from mobile devices, although many others are possible: owner information, phone settings, IMEI, battery level, battery level history, % time charger connected, volume level, ring tones, profile use history, number or history of hard resets, count of contacts, installed applications, network settings, signal strength, radio frequency, tower ID, carrier ID, visiting carrier ID, base station history, carrier ID history, phone number, voicemail number, handset ID, camera capable, SIM ID, audio recording capable, screen resolution, screen color depth, operating system (OS) version, date and time, email configuration, hardware make/model, firmware version, audio playback capabilities, language, memory and % memory used, connection state or type of connection used, volume levels, backlight on/off, sound events, profiles, SIM contacts, turn device powered down, device hibernate, security settings, key pad lock, profiles, and SIM lock. Access to any of this data is scriptable so that the network service provider may decide what metrics to gather from what mobile devices. The service provider may also capture activities (e.g., applications started, network status, cell tower ID) and create standardized scriptable functions that can be combined to create a context sensitive service for the user.

In some examples, prior to initiating a call, the system may communicate with a workflow server to send device diagnostic information to a server over a data channel, such as a server related to a customer service center. For example, a script running on the mobile device may determine an incorrect configuration and attempt to correct the configuration automatically without alerting the user or a customer service agent. For example, the system may initiate a voice call to the IVR system. In some cases, when initiating the voice call, the system may append additional digits to a dialed number, such as the unique identifiers described herein.

The system, upon initiation of the voice call, may then perform one or more of the following actions in response to or in collaboration with the IVR system:

synthesize a DTMF sequence on an analog line (e.g., send a DTMF tone to the IVR system in response to user input or instructions)

recognize and/or interact with a DTMF sequence on an analog line (e.g., send a DTMF tone to the IVR system in response to a received query from the IVR system).

send data or commands to a workflow system (e.g., send configuration information to a center accessible by the device and the IVR system).

receive data or commands from a workflow system (e.g., receive configuration information or instructions used to update the configuration of the device).

update a display or other GUI on or related to the mobile device (e.g., the system may present a user with a menu related to selectable options on the GUI).

receive user input from button presses, soft button presses on a GUI, and so on (e.g., receive a user selection of a voiced or displayed option).

disconnect an analog connection line (e.g., end the voice call while continuing to communicate via data communications).

Conclusion

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the technology is not intended to be exhaustive or to limit the technology to the precise form disclosed above. While specific embodiments of, and examples for, the technology are described above for illustrative purposes, various equivalent modifications are possible within the scope of the technology, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel, or may be performed at different times.

Further, the mobile device may employ many other locally stored applications beyond those described above. For example, the mobile device may include its own IVR system, rather than employing an IVR system at the call center. Thus, the subscriber navigates through a series of IVR menus to access desired information, some of which may be stored on the phone. However, one option in the local IVR could be to have the device place a call to the customer support call center.

In another alternative embodiment, the system may provide links to web pages supplied by the wireless service provider, where these links are to specific web pages directly addressing a need or question relevant to a current status of a user's mobile device. Such an alternative is useful when a mobile device has a web browser and sufficient data connection to the service provider's web server. Thus, a call intercept function on the mobile device may provide a link to a relevant web page, or even access that page automatically so that it is displayed to the user (rather than, for example, displaying locally stored content).

While many embodiments described above employ software stored on the mobile device (either before being given to a subscriber, or during a subscriber call), the scripts and other software noted above may be hard coded into the mobile device (e.g. stored in EEPROM, PROM, etc.). Further, the above functionality may be implemented without scripts or other special modules.

The teachings of the technology provided herein can be applied to other systems, not necessarily the system described above. The elements and acts of the various embodiments described above can be combined to provide further embodiments.

All of the above patents and applications and other references, including any that may be listed in accompanying filing papers, are incorporated by reference. Aspects of the technology can be modified, if necessary, to employ the systems, functions, and concepts of the various references described above to provide yet further embodiments of the technology.

These and other changes can be made to the technology in light of the above Detailed Description. While the above description details certain embodiments of the technology and describes the best mode contemplated, no matter how detailed the above appears in text, the technology can be practiced in many ways. Details of the local-based support system may vary considerably in its implementation details, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific embodiments disclosed in the specification, unless the above Detailed Description section explicitly defines such terms. Accordingly, the actual scope of the technology encompasses not only the disclosed embodiments, but also all equivalent ways of practicing or implementing the technology under the claims.

While certain aspects of the technology are presented below in certain claim forms, the inventors contemplate the various aspects of the technology in any number of claim forms. For example, while only one aspect of the technology is recited as embodied in a computer-readable medium, other aspects may likewise be embodied in a computer-readable medium. Accordingly, the inventors reserve the right to add additional claims after filing the application to pursue such additional claim forms for other aspects of the technology.

We claim:

1. A method of navigating a voice response system using a navigation script executing on a mobile device, the method comprising:
  receiving, at the mobile device, an indication of a user-initiated voice call to a destination number over a voice channel;
  automatically determining, on the mobile device, that the destination number is associated with the voice response system by comparing the destination number with numbers contained in a database,
    wherein the database is local to the mobile device, and
    wherein the database contains information mapping multiple voice response systems to corresponding multiple voice response navigation scripts;
  accessing, at the mobile device, one of the multiple voice response navigation scripts based on the information in the database and the destination number; and
  executing the voice response navigation script on the mobile device,
    wherein the navigation script was configured prior to being executed on the mobile device,
    wherein the navigation script includes a pre-programmed sequence of one or more inputs to be automatically supplied to the voice response system in response to establishing a connection with the voice response system without requiring further user input in relation to the navigation script, and
    wherein the pre-programmed sequence of one or more inputs represents one or more of: user identification information and promotion code information.

2. The method of claim 1, wherein the voice response navigation script interacts with the voice response system using dual tone multiple frequency tones sent over the voice channel.

3. The method of claim 1, wherein the voice response navigation script is configured to interact with the voice response system over a data channel.

4. The method of claim 1, further comprising:
  displaying information to a user of the mobile device, wherein the displayed information relates to the interaction with the voice response system.

5. A method of navigating a voice recognition system using a mobile device, comprising:
  determining, on the mobile device, that a destination number is associated with a voice recognition system by comparing the destination number with numbers contained in a database,
    wherein the database is local to the mobile device and contains a mapping of voice recognition systems to voice recognition navigation applications;
  initiating, on the mobile device, a voice call from the mobile device to the destination number associated with the voice recognition system over a voice communications channel;
  receiving, at the mobile device, an indication of one of the voice recognition navigation applications configured to navigate the voice recognition system associated with the destination number; and
  launching, on the mobile device, the indicated voice recognition navigation application to navigate the voice recognition system;
    wherein the voice recognition navigation application is configured, prior to being launched, to automatically transmit, in response to establishing a connection with the voice response system and without requiring further user input in relation to the voice recognition navigation application, over the voice communications channel or a data communications channel a pre-determined sequence of one or more inputs to the voice response system,
    wherein the pre-determined sequence of one or more inputs correspond to one of multiple options available on the voice recognition system and represents one or more of: user identification information and promotional code information.

6. The method of claim 5, wherein interacting with the voice response system over the voice communications channel includes transmitting dual tone multiple frequency tones to the voice response system.

7. The method of claim 5, wherein interacting with the voice response system over the voice communications channel includes:
receiving dual tone multiple frequency tones from the voice response system; and
transmitting tones from the mobile device in response to the tones received from the voice response system.

8. The method of claim 5, wherein interacting with the voice response system over the data communications channel includes transmitting data related to data transmitted over the voice communications channel.

9. The method of claim 5, further comprising:
receiving input from a user of the mobile device related to the destination number; and
initiating the voice call in response to the received input.

10. The method of claim 5, wherein the application is launched before the voice call is initiated.

11. The method of claim 5, wherein the voice recognition navigation application is launched before the voice call is initiated and data related to the voice call is transmitted over the data communications channel to a workflow system associated with the voice response system before the voice recognition navigation application interacts with the voice response system over the voice communications channel.

12. A system in a mobile device for navigating an interactive voice response system, comprising:
a voice communications component, wherein the voice communications component is configured to—
initiate a voice call to a desired number;
determine that the desired number is a number associated with the interactive voice response system by comparing the desired number with numbers contained in a database,
wherein the database is local to the mobile device and contains a mapping of voice response systems to pre-determined sequences of audio signals corresponding to options available through the interactive voice response systems;
automatically transmit one or more the pre-determined sequences of audio signals over a voice channel from the mobile device to the interactive voice response system,
wherein the automatically transmitting is in response to establishing a connection with the interactive voice response system and does not require further user input, and
wherein the transmitted one or more sequences represent one or more of: user identification information and promotional code information; and
receive audio information over the voice channel from the interactive voice response system; and
an action component, wherein the action component performs an action corresponding to an option from the set of options available through the interactive voice response system,
wherein the action is in response to the initiated voice call to the number associated with the interactive voice response system.

13. The system of claim 12, further comprising:
an identification component, wherein the identification component adds a unique identifier associated with the mobile device to the called number.

14. The system of claim 12, wherein the performed action includes transmitting dual tone multiple frequency tones from the mobile device to the interactive voice response system.

15. The system of claim 12, wherein the performed action includes transmitting data related to the voice call to a workflow system associated with the interactive voice response system.

16. The system of claim 12, wherein the performed action includes displaying content received from the called number to a user of the mobile device.

17. The system of claim 12, wherein the performed action includes transmitting audio information to the interactive voice response system in response to input received by the mobile device from the user.

18. The system of claim 12, wherein the performed action includes transmitting digital information to the interactive voice response system in response to input received by the mobile device from the user.

19. The system of claim 12, wherein the performed action includes establishing a data communication connection between the mobile device and the interactive voice response system and disconnecting the voice call after the data communication connection is established.

20. A computer-readable storage device whose contents cause a mobile device to perform a method of updating functionality of the mobile device, the method comprising:
determining, on the mobile device, that a destination number is associated with a voice response system by comparing the destination number with numbers contained in a database,
wherein the database is local to the mobile device and contains a mapping of voice response systems to voice response navigation script identifiers;
receiving, at the mobile device from the database, a voice response navigation script or an indication of a voice response navigation script, associated in the database with the destination number;
launching, on the mobile device, the voice response navigation script,
wherein the voice response navigation script is configured to automatically transmit a pre-determined sequence of audio data to the voice response system associated with a service provider related to the mobile device;
initiating, on the mobile device, a voice call to a number associated with the interactive voice response system,
wherein the initiating comprises automatically transmitting, to the voice response system, the pre-determined sequence of audio data,
wherein the automatic transmitting is in response to establishing a connection with the voice response system and does not require further user input, and
wherein the transmitted pre-determined sequence represents one or more of: user identification information and promotional code information; and
receiving, on the mobile device, data from the service provider in response to the transmitted pre-determined sequence of audio data,
wherein the received data related to changing the functionality of the mobile device.

21. The computer-readable storage device of claim 20, wherein the audio data is dual tone multiple frequency tones generated by the voice response navigation script.

22. The computer-readable storage device of claim 20, wherein the data related to the function is received via a data communications channel.

23. The computer-readable storage device of claim 20, wherein the voice call is disconnected after the audio data is transmitted.

24. The computer-readable storage device of claim 20, wherein the functionality of the mobile device includes configuration of the mobile device.

\* \* \* \* \*